(12) United States Patent
Xu et al.

(10) Patent No.: US 12,375,886 B2
(45) Date of Patent: Jul. 29, 2025

(54) METHODS AND APPARATUSES FOR USER EQUIPMENT AGGREGATION

(71) Applicants: Hua Xu, Ottawa (CA); Jianglei Ma, Ottawa (CA)

(72) Inventors: Hua Xu, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 335 days.

(21) Appl. No.: 17/825,375

(22) Filed: May 26, 2022

(65) Prior Publication Data

US 2022/0394433 A1 Dec. 8, 2022

Related U.S. Application Data

(60) Provisional application No. 63/197,071, filed on Jun. 4, 2021.

(51) Int. Cl.
*H04W 4/08* (2009.01)
*H04W 8/24* (2009.01)

(52) U.S. Cl.
CPC ............ *H04W 4/08* (2013.01); *H04W 8/24* (2013.01)

(58) Field of Classification Search
CPC .......... H04W 4/08; H04W 4/06; H04W 8/24; H04W 52/0216; H04W 52/0219; H04W 72/0453; H04L 69/24
See application file for complete search history.

(56) References Cited

U.S. PATENT DOCUMENTS

| 2005/0009524 A1* | 1/2005 | Garani ............... H04W 4/08 455/445 |
| 2019/0014498 A1 | 1/2019 | Gao et al. |
| 2020/0374970 A1* | 11/2020 | Wang ............... H04W 52/0219 |
| 2021/0029516 A1 | 1/2021 | Wang et al. |

(Continued)

FOREIGN PATENT DOCUMENTS

| CN | 112188479 A | 1/2021 |
| CN | 112788679 A | 5/2021 |

OTHER PUBLICATIONS

CMCC New SID on UE Aggregation 3GPP TSG RAN Meeting#91e RP-210395, Mar. 26, 2021,total 4 pages.

(Continued)

*Primary Examiner* — Jamal Javaid

(57) ABSTRACT

The present disclosure provides detailed specifications related to user equipment (UE) aggregation. As an example, a virtual UE (VUE) configuration, also referred to as a configuration for UE aggregation, that can be used by multiple UEs participating in UE aggregation may be communicated in a wireless communication network. The configuration may indicate, for example, that the UEs are to participate in UE aggregation, and indicate a first UE for splitting or combining data. In some embodiments the configuration may indicate protocol stacks for the multiple UEs to participate in UE aggregation, and an anchor point. The anchor point is associated with a layer in the protocol stack of a first UE of the multiple UEs, and implements data splitting and/or aggregation. As an alternative to the specific example of an anchor point, a configuration may indicate a function for splitting or aggregating data.

19 Claims, 17 Drawing Sheets

(56) References Cited

U.S. PATENT DOCUMENTS

| | | | |
|---|---|---|---|
| 2021/0153063 A1 | 5/2021 | Zhang et al. | |
| 2021/0352701 A1* | 11/2021 | Taherzadeh Boroujeni | ................ H04W 72/23 |
| 2021/0399770 A1 | 12/2021 | Xu et al. | |

OTHER PUBLICATIONS

3GPP TSG RAN Meeting #85, RP-191831, "Further views on Rel-17 work area on NR sidelink enhancements for V2X and other use cases", Huawei, HiSilicon, Newport Beach, USA, Sep. 16-20, 2019, XP051782380, 13 pages.

* cited by examiner

☒ Time resource allocated for VUE
☐ Time resource allocated for individual UE
   (e.g., UE#1 and UE#2)

☒ Time resource allocated/scheduled for component UE#1
☒ Time resource allocated/scheduled for component UE#2

METHODS AND APPARATUSES FOR USER EQUIPMENT AGGREGATION

CROSS-REFERENCE TO RELATED APPLICATION

This application is related to and claims the benefit of U.S. Provisional Patent Application No. 63/197,071, filed on Jun. 4, 2021, the entire contents of which are incorporated herein by reference.

FIELD

This application relates generally to communications in a wireless communication network, and in particular to User Equipment (UE) aggregation that aggregates features or functions of multiple UEs together.

BACKGROUND

In Long Term Evolution (LTE) communication networks, UEs can communicate directly with each other. In LTE communications networks, direct communications between UEs is generally referred to a LTE Device-to-Device (D2D) communications. Research on LTE D2D was primarily focused on communications between UEs. New Radio (NR) communication networks support Vehicle to anything (V2X) communications, and NR D2D research has focused on "Uu link" communications between a gNodeB (gNB) and UEs, and on sidelink (SL) communications between UEs.

For Uu link communications with a gNB, such as uplink transmissions, a UE is limited in terms of its functions, features, or operations, by such factors as its number of antennas, total available transmit power, specified or mandated restrictions on transmit power, and ability to support operating or communicating in modes. For example, some UEs may support carrier aggregation (CA) or dual connectivity (DC). Other factors may also or instead limit functions, features, or operations of a UE.

The limitations in the functions, features, or operations of a UE, especially in respect of Uu link communications with a gNB, may directly impact performance of not only the UE, but also more generally communication system performance.

UE cooperation is a communication technique that focuses on cooperative procedures among multiple UEs in a group of UEs. UE cooperation may be achieved by multiple UEs in a group of UEs (generally referred to as a cooperation group) cooperating with each other to assist one or more of the multiple UEs in the cooperation group with either or both of Uu link communications with a gNB and sidelink communications between a UE in the group of UEs with another UE outside the cooperation group. UE cooperation could be useful to, for example, enhance the functions, features, or operations of the UEs in the group of UEs, such as any one or more of communication network throughout, coverage, capacity, latency, and reliability, but can introduce challenges in terms of configuring or managing a group of UEs for UE cooperation.

SUMMARY

Embodiments of the present disclosure relate to methods and apparatus for configuring UEs for UE aggregation, which may be considered a kind of UE cooperation. UE aggregation that is enabled by UE cooperation involves aggregating features or functions of multiple individual UEs together to provide enhanced capability. Each UE in a communication network may have limitations that may impact the UE's performance in the communication network. Effects of limitations of individual UEs may potentially be mitigated by aggregating features and functions of multiple individual UEs together to provide an aggregated UE. A plurality of aggregated UE(s) may also be referred to as a "super" UE, a "virtual" UE, or an "enhanced" UE for convenience, herein or elsewhere, although "virtual UE" and "VUE" are used primarily herein. A virtual UE (VUE) has enhanced capability relative to the capability of one or more of the individual UEs, with respect to diversity, power, and/or other features, functions, or operations. Such a virtual UE (VUE) may provide improved UE performance and may improve communication system performance.

According to embodiments disclosed herein, configuring UEs for UE aggregation includes configuring multiple individual UEs that are in proximity to each other with an aggregated UE configuration (otherwise referred to as a VUE configuration), which enables using of the individual UE of the multiple individual UEs that is configured with an aggregated UE configuration (or VUE configuration) as an aggregated UE (or VUE) that has enhanced capability (referred to a VUE capability).

Configuring a VUE refers to an action, by a network device, to instruct, command, order, or otherwise cause individual UEs to be configured so that any one of the individual UEs may form or in effect operate or behave as an aggregated UE (or VUE). Configuring a VUE may involve a network device transmitting, and one or more of the individual UEs receiving, a VUE configuration or other signaling that carries or is indicative of a VUE configuration. For example, signaling that carries or is indicative of a VUE configuration may be or include higher layer signaling, such as radio resource control (RRC) signaling.

The aggregated UE (or VUE) configuration includes a set of protocol stacks and an anchor point. The anchor point is a function that is located, supported, or operated in one layer of the protocol stack for each individual UE.

Any individual UE of the multiple individual UEs may form an aggregated UE (or VUE) based on the aggregated UE configuration (or VUE configuration). The VUE formed by one individual UE includes the individual UE that is forming the VUE and one or more of the other individual UEs of the multiple individual UEs.

For uplink transmissions, the anchor point, which is located in one layer of the protocol stack of one individual UEs that participates in UE aggregation, or is part of a VUE, splits uplink data that is being transmitted by the one individual UE into multiple streams. One stream of the multiple streams is transmitted to a network device (e.g. gNb) by the one individual UE using Uu link communications and the other streams of the multiple streams are transmitted to the other individuals UEs of the VUE to the network device (e.g. gNB). The other streams are routed or dispatched to the other UEs by the one individual using sidelink communications. For downlink transmissions by the network device (e.g. gNB), individual UEs that participate in UE aggregation, or that are part of the VUE, receive at least some of the downlink data transmitted by the network device (e.g. gNB). Each individual UE dispatches or routes the downlink data received through its protocol stack until the downlink data reaches a layer of its protocol stack that that corresponds to the layer in the protocol stack of the one individual UE that formed the VUE that includes the anchor point. The anchor point receives downlink data from each of the individual UEs that are part of the VUE and aggregates the downlink data to provide aggregated downlink data to the one individual UE that formed the VUE.

Disclosed embodiments of UE aggregation also encompass de-configuring or otherwise disabling a VUE.

Disclosed embodiments of UE aggregation also encompass capability reporting. In some embodiments, a UE reports its own capability, including whether it is capable of UE aggregation. VUE or VUE capability might or might not necessarily be reported. A network device could configure each individual UE with a UE aggregation configuration even if VUE capability is not reported, although this approach may involve more overhead as a result of using multiple UE identifiers for configuring each individual UE. If a VUE is configured by a network device, or VUE capability is reported to a network device, then from a network device perspective, a VUE is just another UE and the network device could simplify operations such as scheduling and feedback using a single VUE identifier instead of dealing with each individual UE. Certainly a network deice would still be aware that VUE includes multiple individual UE(s). For example, although a network device (e.g. gNB) could communicate with each of the individual UEs included in a VUE, this may involve treating each UE separately in terms of scheduling. If multiple individual UEs are reported as a VUE, then the network device (e.g. gNB) may treat the VUE as a single UE, rather than multiple individual UEs.

In some embodiments, each individual UE reports its capability (referred to a UE capability), including whether it supports UE aggregation to either a network device (e.g. a gNB) or another individual UE of the multiple UEs. Further, after a VUE is formed, the capability of a VUE (referred to a VUE capability), may also be reported to a network device (e.g. a gNb) by an individual UE that formed the VUE.

The present disclosure also contemplates "fallback" from VUE operation at a higher level or degree of UE aggregation to a lower level or degree of UE aggregation. Individual UEs that are part of (i.e. included in) a VUE need not be fixed. Any of various parameters included in the aggregate UE configuration (or VUE configuration), such as the number of individual UEs that are to be part of the VUE, identifiers of the particular individual UEs that are to be part of the VUE, an indication of the capabilities of individual UEs that are to be part of the VUE, for example, may be dynamically controlled and changed.

Aspects of the present disclosure also encompass scheduling of uplink transmissions by the individual UEs that are part of a VUE. Time division multiplexing (TDM) scheduling may be particularly advantageous, for example, in embodiments in which a protocol stack and radio frequency chain of each individual UE included in the VUE are at least shared partially with each other. With TDM scheduling, such shared resources are for only one individual UE at a time.

A VUE provides or supports features or functions of several individual UEs, and accordingly coordination of communications between the individual UEs and a network device (e.g. gNB) for VUE operation may be a challenge. Time offset is disclosed herein as a possible option for coordinating uplink transmissions, and/or potentially other operations, between individual UEs that are part of a VUE.

The present disclosure also contemplates configuring separate VUEs for different applications, such as a VUE for downlink communications, a VUE for uplink communications, or a VUE for both downlink and uplink communications. Configuring separate VUEs may, for example, result in several different VUE configurations with each respective VUE configuration having a different set of protocol stacks for the individual UEs that are part of the VUE. The VUEs for different applications may have different VUE capabilities.

Among others, the present disclosure encompasses embodiments in which a method involves transmitting a configuration for UE aggregation. The configuration is transmitted by an apparatus to a plurality of UEs. The configuration indicates that the plurality of UEs are to participate in UE aggregation, and indicates a first UE for splitting or combining data. Such a method may also involve communicating the data between a network device and the first UE, in accordance with the configuration.

A method according to another embodiment involves receiving, by a UE from an apparatus, a configuration for UE aggregation. The configuration indicates that the UE is to participate as one of a plurality of UEs in UE aggregation, and indicates a first UE for splitting or combining data. The plurality of UEs includes the UE that receives the configuration and the first UE. A part or all of the data is communicated between a network device and the first UE, in accordance with the configuration.

A network device may include a communication interface, a processor that is coupled to the communication interface, and a non-transitory computer readable storage medium that is coupled to the processor. A UE may similarly include a communication interface, a processor that is coupled to the communication interface, and a non-transitory computer readable storage medium that is coupled to the processor.

A non-transitory computer readable storage medium need not necessarily be implement in or in conjunction with a network device or a UE. For example, a computer program product may be or include a non-transitory computer readable storage medium.

In such embodiment, the non-transitory computer readable storage medium stores programming, for execution by a processor. The programming includes instructions to perform a method disclosed herein.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and the advantages thereof, reference is now made, by way of example, to the following descriptions taken in conjunction with the accompanying drawings.

DETAILED DESCRIPTION

To achieve UE aggregation, an aggregated UE or virtual UE (VUE) could be configured, by a network device for example, or formed by a group of individual UEs, with enhanced capability. Aspects of the present disclosure that relate to UE aggregation include, for example:

VUE protocol stacks with different possible data anchor points or "split" points, such as at one of the following protocol layers: packet data convergence protocol (PDCP) layer, radio link control (RLC) layer, medium access control (MAC) layer, physical (PHY) layer;

individual UE and VUE capabilities could be reported by one UE or by the VUE as different UE capabilities, and VUE capability of a UE could be reported dynamically for different configurations such as multiple-input multiple-output (MIMO), CA, DC, etc.;

a VUE and one or more individual UEs could share a protocol stack and physical resources such as a power chain, also referred to as a radio frequency (RF) chain, and a VUE and individual UEs can be scheduled in a time division multiplex (TDM) manner to increase or potentially maximize available transmit power;

a fallback operating mode or "fallback UE" could be configured for a VUE.

These and other aspects of UE aggregation in the context of VUEs are discussed by way of example in further detail at least below.

Figure 1:
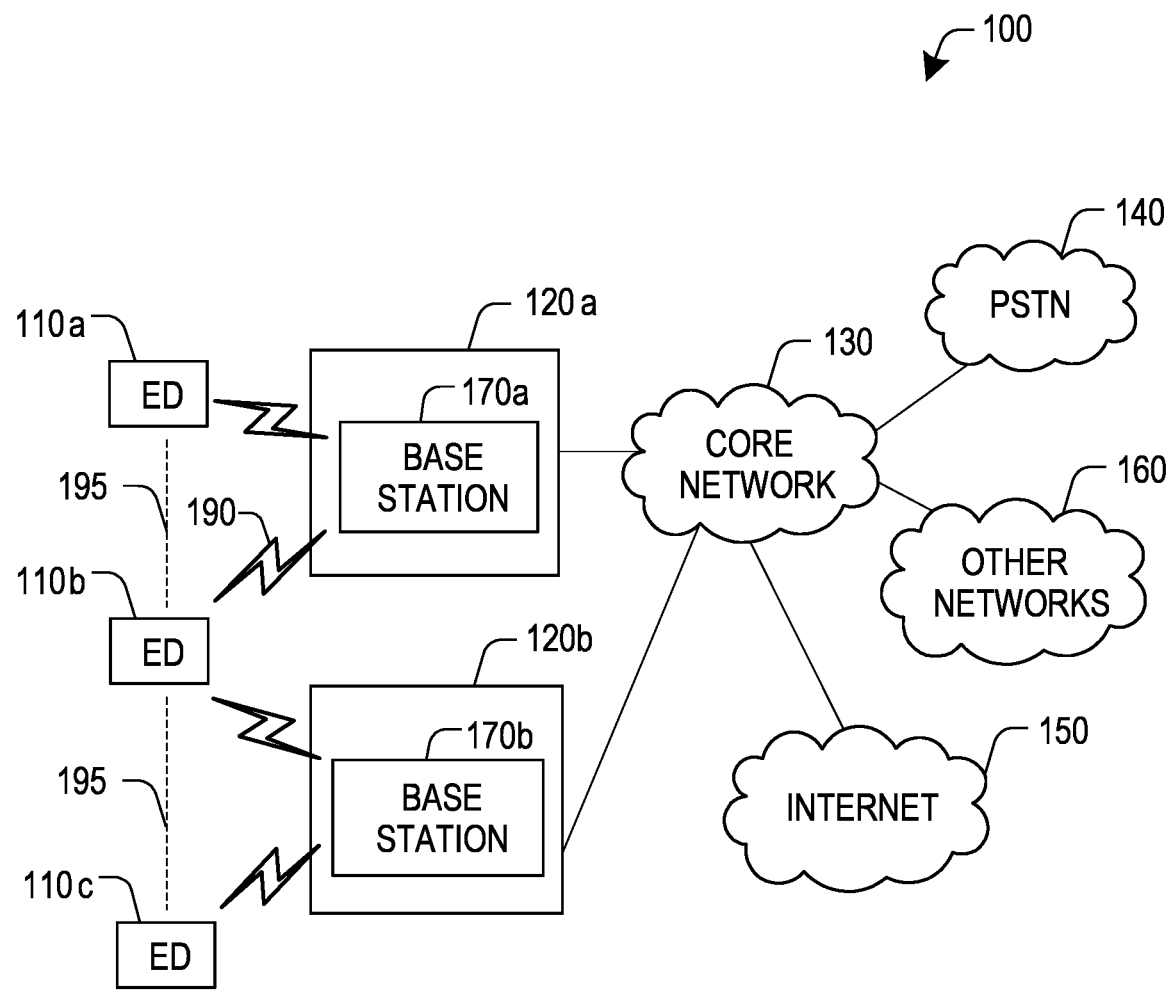
FIG. 1 illustrates an example communication system in which aspects of the present disclosure are implemented in some embodiments.

FIG. 1 illustrates an example communication system 100 in which aspects of the present disclosure are implemented in some embodiments. In general, the system 100 enables multiple wireless or wired elements to communicate data and/or other content. The purpose of the system 100 may be to provide content (e.g., any one or more of voice, data, video, text, referred to collectively herein as "data") via broadcast, unicast, multicast, user device to user device, etc. The system 100 may operate efficiently by sharing communication resources such as bandwidth.

In this example, the communication system 100 includes electronic devices (ED) 110a-110c, Radio Access Networks (RANs) 120a-120b, a core network 130, a Public Switched Telephone Network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices as, or may be referred to as, a User Equipment/device (UE), Wireless Transmit/Receive Unit (WTRU), mobile station, mobile subscriber unit, cellular telephone, station (STA), Machine Type Communication device (MTC), Personal Digital Assistant (PDA), smartphone, laptop, computer, touchpad, wireless sensor, video monitoring camera or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the Internet 150, and/or the other networks 160. For example, the base stations 170a-170b may include (or be) one or more of several well-known devices, such as a Base Transceiver Station (BTS), a Node-B (NodeB), an evolved NodeB (eNodeB), a Home eNodeB, a gNodeB or gNB (next generation NodeB, sometimes called a "gigabit" NodeB), a Transmission Point (TP), a Transmission Reception Point (TRP), a site controller, an Access Point (AP), or a wireless router. Any ED 110a-110c may be alternatively or jointly configured to interface, access, or communicate with any other base station 170a-170b, the internet 150, the core network 130, the PSTN 140, the other networks 160, or any combination of the preceding. Optionally, the system may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, Base Station Controller(s) (BSC), Radio Network Controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b may be configured to operate to transmit and/or receive wireless signals within a particular geographic region or area, sometimes referred to as a coverage area. A cell may be further divided into cell sectors, and a base station 170*a*-170*b* may, for example, employ multiple transceivers to provide service to multiple sectors. In some embodiments a base station 170*a*-170*b* may be implemented as pico or femto nodes where the radio access technology supports such. In some embodiments, MIMO technology may be employed having multiple transceivers for each coverage area. The number of RANs 120*a*-120*b* shown is exemplary only. Any number of RANs may be contemplated when devising the system 100.

The base stations 170*a*-170*b* communicate with one or more of the EDs 110*a*-110*c* over one or more air interfaces 190 using wireless communication links e.g. RF, μWave, IR, etc. The air interfaces 190 may utilize any suitable radio access technology. For example, the system 100 may implement one or more channel access methods, such as Code Division Multiple Access (CDMA), Time Division Multiple Access (TDMA), Frequency Division Multiple Access (FDMA), Orthogonal FDMA (OFDMA), or Single-Carrier FDMA (SC-FDMA) in the air interfaces 190.

A base station 170*a*-170*b* may implement Universal Mobile Telecommunication System (UMTS) Terrestrial Radio Access (UTRA) to establish an air interface 190 using Wideband CDMA (WCDMA). In doing so, the base station 170*a*-170*b* may implement protocols such as HSPA, HSPA+ optionally including HSDPA, HSUPA or both. Alternatively, a base station 170*a*-170*b* may establish an air interface 190 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120*a*-120*b* are in communication with the core network 130 to provide the EDs 110*a*-110*c* with various services such as voice, data, and other services. Understandably, the RANs 120*a*-120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a*-120*b* or EDs 110*a*-110*c* or both, and (ii) other networks (such as the PSTN 140, the Internet 150, and the other networks 160). In addition, some or all of the EDs 110*a*-110*c* may include functionality for communicating with different wireless networks over different wireless links using different wireless technologies and/or protocols. PSTN 140 may include circuit switched telephone networks for providing Plain Old Telephone Service (POTS). Internet 150 may include a network of computers and subnets (intranets) or both, and incorporate protocols, such as IP, TCP, UDP. EDs 110*a*-110*c* may be multimode devices capable of operation according to multiple radio access technologies, and incorporate multiple transceivers necessary to support such technologies.

It is contemplated that the communication system 100 as illustrated in FIG. 1 may support an NR cell, which also may be referred to as a hyper cell. Each NR cell includes one or more base stations using the same NR cell ID. The NR cell ID is a logical assignment to all physical base stations of the NR cell and may be carried in a broadcast synchronization signal. The NR cell may be dynamically configured. The boundary of the NR cell may be flexible and the system dynamically adds or removes base stations to from the NR cell.

In one embodiment, an NR cell may have one or more base stations within the NR cell transmitting a UE-specific data channel, which serves a UE. The one or more base stations associated with the UE specific data channel are also UE specific and are transparent to the UE. Multiple parallel data channels within a single NR cell may be supported, with each data channel serving a different UE for example.

Direct communications between UEs such as the EDs 110*a*-110*c* in FIG. 1 are also possible, and direct communication links 195 between UEs are represented by dashed lines in FIG. 1. UEs communicate with each other over sidelinks, for example, to enable UE aggregation and VUE configuration/formation in some embodiments.

Figure 2:
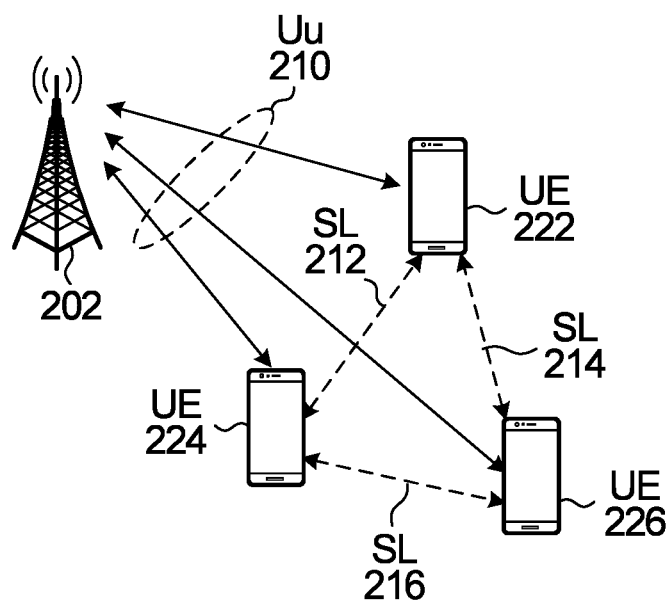
FIG. 2 is a block diagram of illustrating multiple UEs communication with a network node and each other which may be configured into a VUE.

FIG. 2 is a block diagram illustrating multiple UEs which may be configured to form a VUE. In FIG. 2, network equipment 202, also referred to herein as a network device, is in communication with UEs 222, 224, 226. In a cellular network, UEs could connect to a network directly, through a direct communication link, sometimes referred to as a "Uu link", or another cellular link, over a Uu air interface for example. The UEs 222, 224, 226 are "in-coverage" (within a geographical area of direct communication with the network equipment 202) in FIG. 2, and communications between the UEs 222, 224, 226 and the network equipment 202 are through direct communication links shown by way of example as Uu links 210 in FIG. 2. Sidelink communications directly between the UEs 222, 224, directly between the UEs 222, 226, and directly between the UEs 224, 226 are through respective sidelinks 212, 214, 216. Examples of these components and implementation options for communications between these components are provided elsewhere herein. Network equipment 202 may be a network device or network equipment such as a base station 170*a*, 170*b* in FIG. 1 and the UEs may be EDs 110*a*-*c* in FIG. 1, for example.

A VUE could be configured by a network device or formed by a number of individual UEs. In some embodiments, a VUE is configured by a network device, such as a gNB. In some embodiments, a master UE (MUE) or multiple individual UEs themselves could form a VUE, and the MUE or the individual UEs may report the capability of the VUE to a network device.

In the present disclosure, configuring a VUE refers to an action performed, by a network device, to instruct, command, order, or otherwise cause individual UEs to be aggregated to form a VUE. Configuring a VUE may involve a network device transmitting, and one or more of the individual UEs receiving, an aggregated UE (or VUE) configuration or other signaling that carries or is indicative of a aggregated UE (or VUE) configuration. Such a configuration is also referred to herein as a configuration for UE aggregation. For example, signaling that carries or is indicative of an aggregated UE (or VUE) configuration may be or include higher layer signaling, such as radio resource control (RRC) signaling.

Forming a VUE refers to an action performed by any one or of the individual UEs, to be aggregated with each other to form a VUE. Forming a VUE may be in response to receiving an aggregated UE (VUE configuration) from a network device, or may be initiated by any one of UEs itself without being instructed or otherwise caused to do so by a network device. One or more of the individual UEs may make a determination that a VUE is to be formed, and any one of the one or more individual UEs may proceed with forming the VUE. This may involve communicating information, such as information regarding capabilities of each individual UE between the individual UEs. Information related to the VUE may also be provided to a network device after the VUE is formed, so that the network device will be aware of the VUE and be able to communicate with the VUE.

Thus, in the present disclosure, configuring a VUE refers to what could be called network-initiated, network-driven, or network-determined forming of a VUE. Forming a VUE may be in response to a network device configuring the VUE and transmitting a VUE configuration, or may instead refer to what could be called UE-initiated, UE-driven, or UE-determined creation of a VUE without first being instructed to do so by a network device.

UE aggregation refers to a procedure configuring a VUE and forming a VUE that includes multiple individual UEs that are used for data transmission and data reception. The multiple individual UEs cooperate to transmit data from one of the individual UEs (i.e. a first UE of the multiple individual UEs) to a network device. The transmission of data by the first UE using the first UE and other UEs of the multiple UEs may be coordinated by the network device or the VUE. There could exist one or more anchor points at a protocol layer of one or more of the UE(s) where data is split/aggregated to/from a number of paths. Each path is formed by a protocol stack of one of the UEs that forms the aggregated UE (or VUE). UE aggregation may result in an aggregated UE (VUE) that has an enhanced capability, for either or both of transmission and reception of data for example, and the aggregated UE (or VUE) is assigned an identifier by the network. UEs that are aggregated to form an aggregated UE (or a VUE) are referred to herein as individual UEs or component UEs.

UE aggregation may, but need not necessarily, result in a virtual UE with its own identifier. A VUE with enhanced capability may be realized by UE aggregation without necessarily assigning a separate identifier to a virtual UE. A VUE may have additional benefits in terms of scheduling, for example, but configuring a VUE may not result in formation of a VUE.

Capability as used herein refers to an ability, of a UE or a VUE, to support or provide certain features, functions, or operations. For example, MIMO capability indicates that a UE or a VUE supports MIMO communications. Other examples of capabilities are also provided elsewhere herein.

UE capability for UE aggregation refers to a UE capability of an individual UE that may be used for UE aggregation. For example, a UE may have 4 antenna elements in total and report a 4 antenna element capability as a UE capability. The same UE may report capability of 4 or fewer antenna elements as its UE capability for aggregation.

Some embodiments disclosed herein refer to protocol stacks. A protocol stack is where protocol functions exist, and are organized into layers. As an example, a protocol stack in $3^{rd}$ generation partnership project (3GPP) NR radio access network (RAN) includes PDCP, RLC, MAC, and PHY layers. A protocol stack may also be referred as a protocol stack entity, and similarly a protocol stack layer may also be referred to as a protocol layer entity.

A VUE could support either or both of downlink and uplink communications. For uplink traffic (e.g. uplink data), a VUE may include or consist of a first UE that forms the VUE (generally referred to as a source UE (SUE)) and at least one cooperative UE (CUE), where the source UE is the source of traffic and the source UE and the cooperatives UE may be used to transmit the uplink traffic to the network device. For downlink traffic, a VUE may include or consist of a first UE that forms the VUE (generally referred to as a target UE (TUE)) and at least one CUE, where target UE is the destination of received traffic and the TUE and the cooperative UEs receive downlink traffic sent by a network device that is destined for the TUE. The roles of SUE/TUE and CUE could change, and be per-traffic based, for example. The roles of SUE/TUE and CUE could instead be pre-determined and fixed for a particular VUE.

An aggregated UE configuration (or VUE configuration) and/or the capability of a VUE could encompass protocol stacks configuration and/or protocol stacks capability of the VUE. For uplink traffic, for example, data could be split or duplicated into multiple streams, and dispatched from an anchor point in a protocol stack of the source UE through protocol stack(s) of component UE(s) and transmitted by the component UEs. For downlink traffic, data could be collected and combined at an anchor point in a protocol stack of the target UE from protocol stack(s) of component UE(s) after the data is received. A connection or cross-link between an SUE/TUE and a CUE could use a standardized or non-standardized link, such as an NR specified SL, a WiFi link, a Bluetooth link, etc.

The anchor point could be at any of various layers, levels, or points in a protocol stack such, as a PDCP layer, a RLC layer, a MAC layer, or a PHY layer.

FIGS. 3 to 6 are block diagrams illustrating examples of different VUEs having different anchor points. The illustrated VUEs show several options for data splitting or data duplication for uplink data transmission and/or data collection/combining for downlink/reception at different anchor points. The VUEs shown in FIGS. 3 to 6 include two UEs that are labeled as a source UE (SUE) and a cooperating UE (CUE). The bidirectional links between the SUE and the CUE and bidirectional inter-layer links shown in FIGS. 3 to 6 are intended to indicate that VUEs in these drawings are for uplink transmissions and reception of downlink transmissions.

Figure 3:
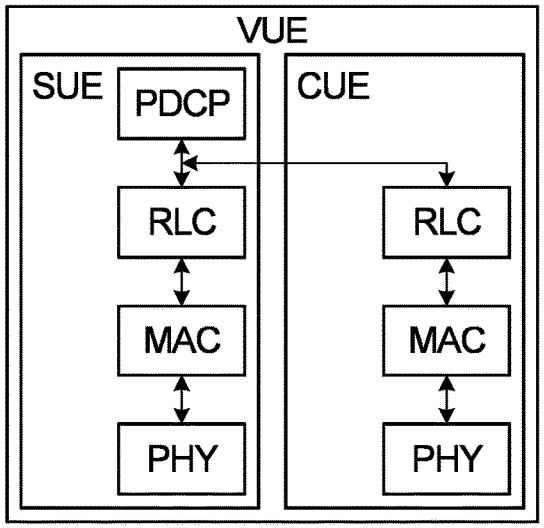
FIGS. 3 to 6 are block diagrams illustrating example embodiments of different VUEs that have been configured by a network node or a UE.

For example, for FIG. 3, uplink protocol data unit (PDU) packets from the PDCP layer of the SUE could be split or duplicated into multiple streams of PDU packets. One stream of packets in this example goes through the RLC layer, the MAC layer, and the PHY layer of the protocol stack of the SUE for transmission to a network device, such as a gNB. The other stream of packets in this example could be dispatched or routed to the CUE through the anchor point, shown as a cross-link between the SUE and the CUE in FIG. 3. That other stream of packets then goes through the RLC layer, the MAC layer, and the PHY layer of a protocol stack of the CUE and is transmitted, by the CUE, to the same network device (e.g. gNB), or to different network devices (e.g. gNBs). At the gNB, not shown in FIG. 3, two streams of packets are received and decoded by the gNB(s). The received streams of packets go through two separate protocol stacks and are aggregated at the PDCP layer of a gNB. For downlink, a reverse process may be applied. More generally, for the example in FIG. 3 and other examples herein, data may be processed through one or more sets of protocol stacks, at individual UEs and/or at different gNBs for example.

Figure 4:
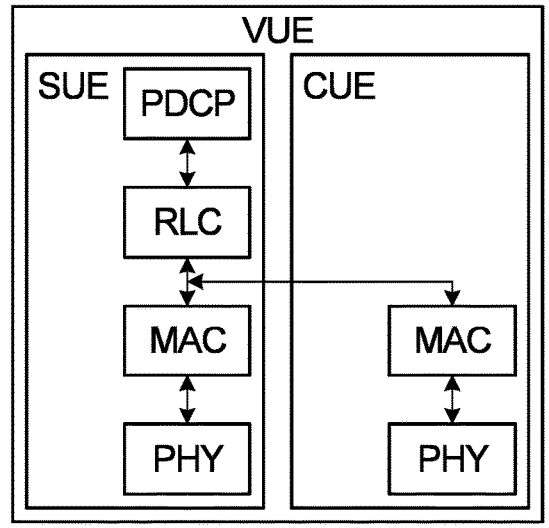

In the example VUE shown in FIG. 4, uplink packets from the RLC layer of the SUE could be split or duplicated. One stream of packets could go through protocol stacks of the SUE and be transmitted to a gNB or other network device, while the other stream of packets could be dispatched or routed to the CUE through the cross-link between the SUE and the CUE. This other stream of packets then goes through a protocol stack of the CUE and is transmitted to the same gNB. At the gNB, not shown in FIG. 4, two streams of packets are received and decoded, and go through two separate protocol stacks and are aggregated at the RLC layer of the gNB and provided to the PDCP layer of the gNB. For downlink, a reverse process may be applied.

Figure 5:
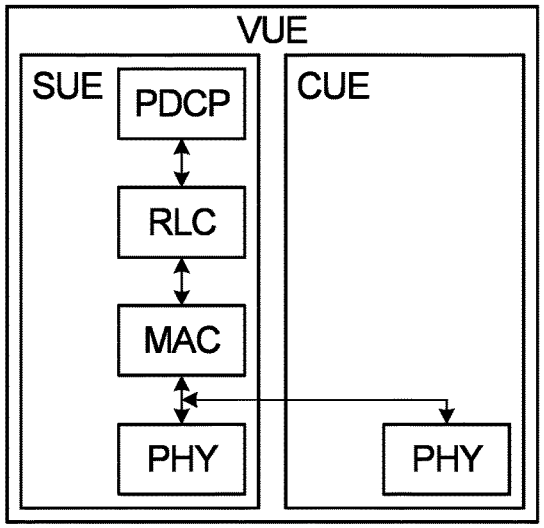

Similarly, for the example VUE shown in FIG. 5, uplink packets from the MAC layer of the SUE could be split or duplicated into two streams of packets. One of the streams of packets could be routed to the PHY layer of the SUE and is transmitted to a gNB or other network device, and the other stream of packets could be dispatched or routed to the CUE through the cross-link between the SUE and the CUE. The CUE receives the other stream of packets and the CUE routes the other stream of packets through the PHY layer of the CUE and is transmitted to the gNB. At the gNB side, not shown in FIG. 5, two streams of packets are received and decoded, and are then aggregated at the MAC layer of the gNB. For downlink, a reverse process may be applied.

Figure 6:
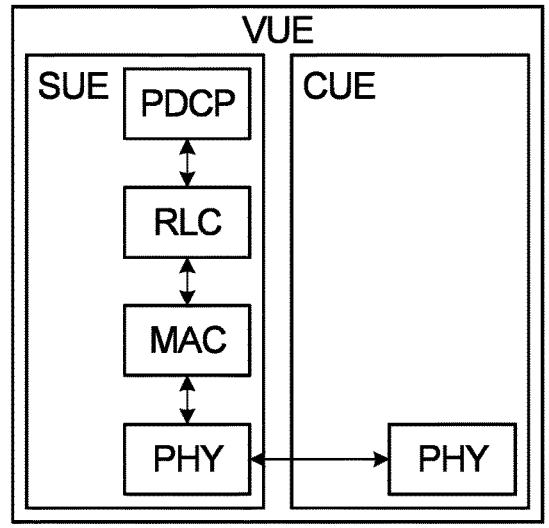

Finally, for the example in FIG. 6, uplink packets from the PYH layer of the SUE, for example after a channel encoder, could be distributed to both the SUE and the CUE (via the cross-link between the SUE and the CUE) and transmitted to a gNB or other network device. At the gNB side, not shown in FIG. 6, signals from the SUE and the CUE are received and decoded, and may be jointly decoded in some embodiments. For downlink, a reverse process may be applied.

For a VUE supporting these types of anchor points and data split/duplication/path switch (meaning that a transmission path may be switched from an anchor point) or collection/combination, a capability could be reported as follows:

for a VUE having an anchor point at a PDCP layer of the protocol stack of the SUE and the CUE as shown in FIG. 3, and performing data split/duplication or collection/combination at the PDCP layer, the VUE could be reported as a UE with dual connectivity (DC) capability (i.e., a UE that is capable of supporting DC);

for a VUE having an anchor point at the MAC layer of the SUE and the CUE as shown in FIG. 5, performing data split/duplication or collection/combination at the MAC layer, the VUE could be reported as a UE with carrier aggregation (CA) capability (i.e., a UE that is capable of supporting CA), if the SUE (or a TUE) and CUE operate on different component carriers;

for a VUE having an anchor point at the MAC layer or the PHY layer of the SUE as shown in FIG. 5 or FIG. 6, with data split/duplication or collection/combination at the MAC layer or the PHY layer, the VUE could be reported as a UE with a higher number of antennas capability (i.e., a UE that is capable of supporting more transmit/receive antennas (for MIMO for example)) than at least the SUE (or a TUE) on its own, if the SUE (or the TUE) and the CUE operate on the same carrier.

The examples above refer to reporting a VUE as a UE with a capability or a UE that is capable of supporting certain features, functions, or operations. A VUE is a form of UE, and a VUE may have one or more capabilities. The capabilities referenced above are examples of capabilities that may be relevant to the particular VUEs shown in FIGS. 3 to 6 and may be reported to a network device. A VUE may have other capabilities, and reported capability for a VUE may include other aspects as well. When a VUE has been formed and is to enter and operate in a network, the VUE will report its capability to a network device, and also indicate that it is a UE. This is referred to herein primarily as reporting VUE capability, but may also be referred to as reporting the VUE.

The example VUEs shown in FIGS. 3-6 may provide any of several benefits or advantages.

A VUE whose anchor point is at a PDCP layer as shown in FIG. 3, for example, may have DC capability and enable the VUE to connect to a network via two separate links to one or two network devices. This boosts capacity of the VUE relative to a single connection. Conventional dual connectivity (DC) in 3GPP may refer to two connections to two network devices such as gNBs, at different frequencies. This restriction could be relaxed in accordance with embodiments disclosed herein, such that two connections could refer to two separate links to the same network device and on the same frequency.

For a VUE whose anchor point is at a MAC layer, CA capability may be provided, and the VUE could connect to a network on two separate carriers. This boosts capacity relative to UE that connects to a network on a single carrier.

Antenna number/MIMO capability may be provided or enhanced for a VUE that has an anchor point at a MAC layer or a PHY layer. This boosts the MIMO capability with more transmit antennas (e.g., 4 antennas) relative to non-MIMO or relative to MIMO capability with fewer antennas (e.g., 1 or 2 antennas)

For all of these example anchor points, and an anchor point at the RLC layer as shown in FIG. 4, UE aggregation and a VUE may provide increased transmit power relative to a single UE because there are two UEs, including an SUE and a CUE in the examples shown but there may be more UEs in other embodiments, transmitting data. Not only is there increased available transmit power due to the multiple UEs in a VUE, there may also be a benefit in that per-UE transmit power restrictions apply to each individual UE rather than to the VUE as a whole. For example, with a per-UE transmit power limit, each individual UE may transmit at a power only up to the limit, whereas maximum VUE transmit power is a multiple of the per-UE transmit power limit.

Thus, UE aggregation and VUEs may provide benefits in terms of increased transmit power, and particular anchor points may provide additional advantages as well, in terms of DC, CA, or MIMO as in the examples referenced above.

The VUEs in FIGS. 3-6 include an SUE and a CUE. Other embodiments are also possible. For example, more than two UEs may be aggregated to form a VUE. For downlink communications, a VUE may include a TUE instead of an SUE, and one or more CUEs. In such a VUE, the anchor point is in the protocol stack of the TUE.

A VUE and its individual "component" UEs may have different capabilities. A UE could be reported as an individual UE and also be configured as part of a VUE. Alternatively, one or more UEs could report their own UE capability and also form a VUE and report VUE capability.

The form of a VUE with its capability could be more dynamic, meaning from time to time, different VUEs could be formed with different capability, or different VUEs with different capability could be configured from time to time.

In some embodiments, a network device such as a gNB assigns a separate identifier or a set of separate identifiers, such as a radio network temporary identifier (RNTI), to a VUE. The separate identifier(s) assigned to a VUE could be different from those of the individual UE(s) that the VUE is composed of. Different VUEs, even if formed or configured from the same individual UEs, may have respective different identifiers such as different RNTIs.

Figure 7:
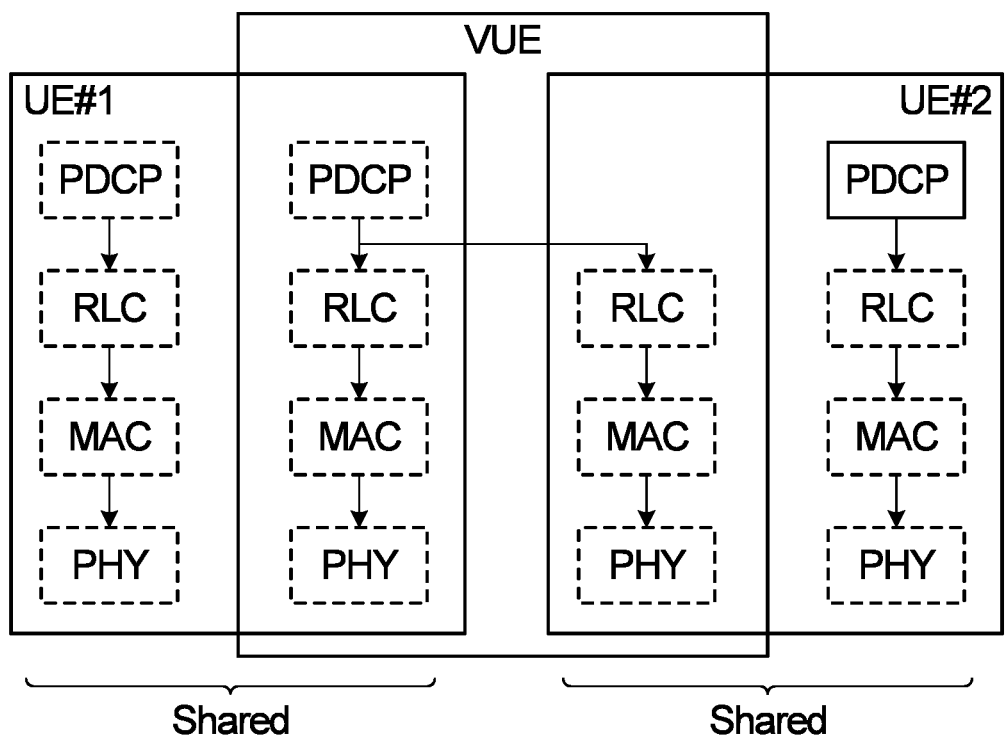
FIG. 7 is a block diagram illustrating protocol stacks of individual UEs that are part of a VUE according to an embodiment.

Each individual UE and the VUE(s) formed by the individual UEs could share or partially share the same set(s) of protocol stacks. Each individual UE could also have separate dedicated and VUE-shared protocol stacks. FIG. 7, for example, is a block diagram illustrating protocol stack sharing between individual UEs and a VUE according to an embodiment. In the example shown, each of two individual UEs, UE #1 and UE #2, has one protocol stack that is shared (by UE #1) or partially shared (by UE #2) with a VUE. Although the shared protocol stack at UE #1 and the shared part of the protocol stack at UE #2 are illustrated twice in FIG. 7, the dashed lines are intended to indicate that FIG. 7 is an example of shared or partially shared protocol stacks, rather than separate dedicated and shared protocol stacks.

In general, a set of protocol stacks at a UE may include one or more protocol stacks that may be partially or entirely shared or non-shared with a VUE. An entire protocol stack of UE #1 is shared in FIG. 7, and a set of protocol stacks of UE #1 may also include one or more non-shared protocols stacks. Similarly, a protocol stack of UE #2 is partially shared in FIG. 7, and a set of protocol stacks of UE #1 may also include one or more non-shared protocols stacks. Any one or more layers of a UE protocol stack may be shared or non-shared with a VUE.

Another feature that may also or instead be provided in some embodiments relates to fallback, according to which a VUE may have, or be configured with, a fallback UE.

Figure 8:
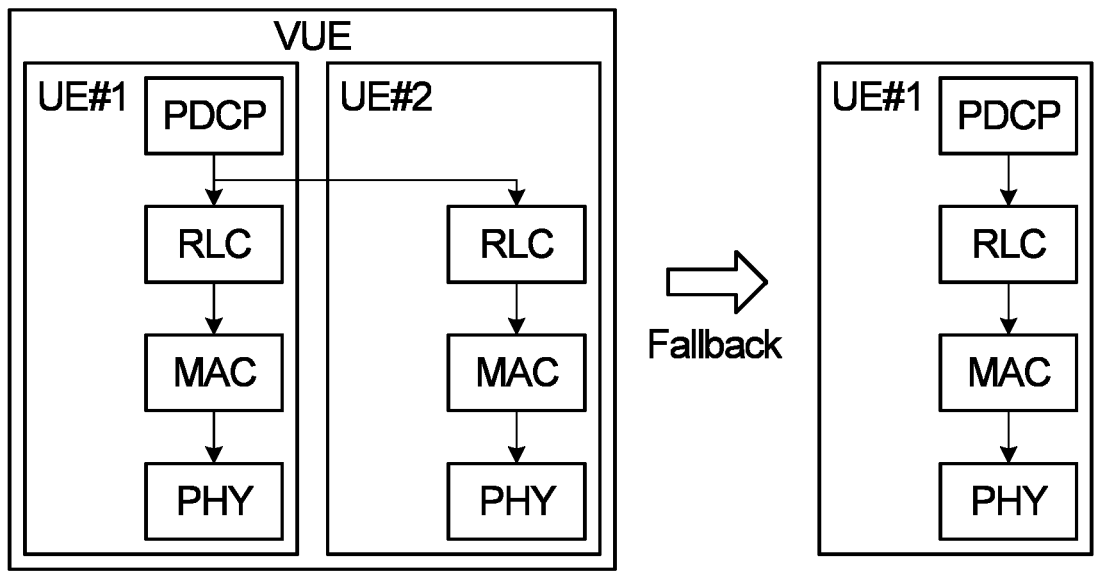
FIGS. 8 and 9 are block diagrams illustrating examples of VUE fallback to a single component UE, for uplink communications and both uplink and downlink communications, respectively.
Figure 9:
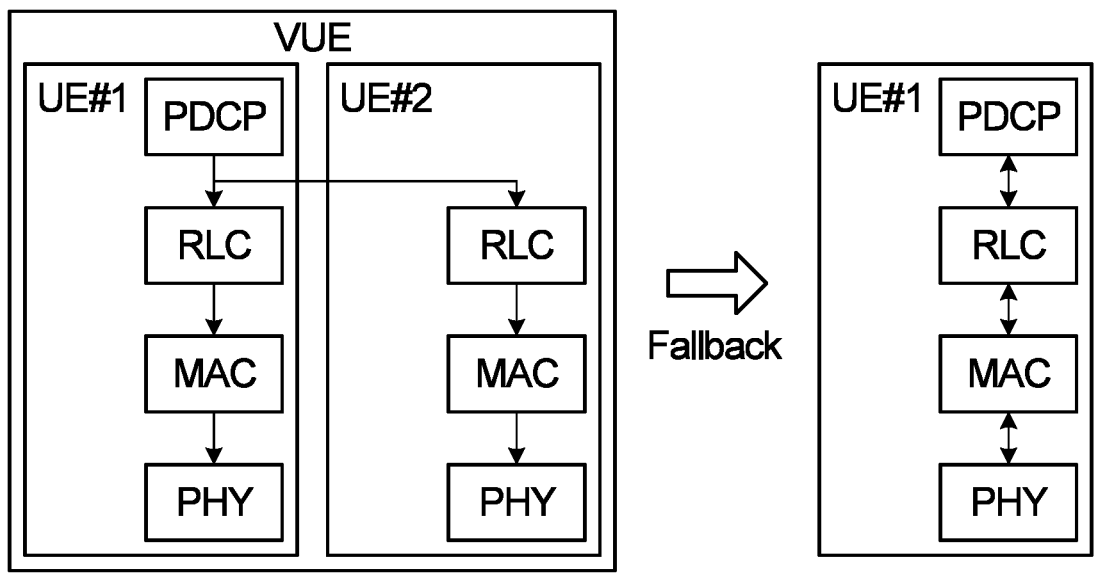

A VUE could fall back to a subset of its component UEs, which may include only one component UE in some embodiments. FIGS. 8 and 9 are block diagrams illustrating examples of VUE fallback to a single component UE, for uplink communications in FIG. 8 or both uplink and downlink communications in FIG. 9. Although not shown in the drawings, fallback may also or instead be used only for downlink communications. In the examples shown in FIGS. 8 and 9, the VUE falls back to UE #1. In other embodiments, the example VUE may fall back to UE #2. More generally, a VUE may fall back to a subset of one or more, but fewer than all, of its component UEs.

A fallback UE could be configured as part of VUE configuration, or reported as part of VUE capability. The configuration of a fallback UE or capability report of a fallback UE may include, for example, one or more of: transmit power, number of antennas, etc. A fallback UE may be composed one component UE or fewer component UEs of a VUE, and accordingly a fallback UE may have fewer antennas or transmit power than a VUE.

A VUE, and its fallback UE which involves a lesser degree of UE aggregation of fewer UEs or no UE aggregation in the case of a single UE as a fallback UE, could use the same identifier, such as the same VUE RNTI. Even though a fallback UE may be a single UE, shown by way of example as UE #1 in FIGS. 8 and 9, the fallback UE could still use the VUE RNTI instead of its "own" RNTI that is used for individual UE operation. This is because a fallback UE of a VUE would still be used to transmit and/or receive data for the VUE.

A VUE supporting downlink communications only or uplink communications only could have a fallback UE configured on the same link or for the same direction of communications (uplink or downlink), or both links or for both directions of communications (uplink and downlink). For example, the VUE in FIGS. 8 and 9 is configured for UL communications only, and may have a fallback UE configured for uplink communications only, as shown in FIG. 8, or for both uplink and downlink communications as shown in FIG. 9.

Switching between a VUE and a fallback UE, which may be referred to as non-VUE in some embodiments, could be dynamic or semi-static. Such switching may be explicitly or implicitly indicated. An explicit indication may be carried, for example, in downlink control information (DCI) or other signaling including uplink control or higher layer signaling. An implicit indication could be based on different DCI formats, such as VUE using one DCI format and its fallback UE using another DCI format. In some embodiments, switching between a VUE and a fallback UE occurs depending on which DCI form is blindly detected. Alternatively, an implicit indication could be based on different pre-configured resources used for transmission. In some embodiments, switching between a VUE and a fallback UE occurs depending on which pre-configured resources are blindly detected as carrying a data transmission.

In yet another alternative, switching is based on a number of DCIs detected. For example, multi-DCI may be used to schedule VUE transmission, if a VUE supports DC or CA operation. One DCI could be used on each carrier. In such embodiments, switching between a VUE and a fallback UE may occur depending on whether only a DCI assigned for a fallback UE is blindly detected. If only the DCI assigned for the fallback UE is detected, then switching to the fallback UE is implicitly indicated. If multi-DCI are detected, then switching to normal VUE is implicitly indicated.

Sidelink communications or other UE-to-UE communications could also or instead be involved in VUE/fallback UE switching, to convey an indication message for the switching for example.

The fall back of a VUE to its fallback UE may be triggered either by a network device such as a gNB or by the VUE itself. For example, traffic to be delivered is below a threshold, or the VUE needs to save energy, either the gNB or the VUE could trigger fall back of the VUE to its fallback UE Fallback features are described above primarily with reference to a fallback UE, and in the context of a VUE and a fallback UE with no UE aggregation. This description is intended to be illustrative and non-limiting. For example, fallback may also or instead be referenced or described in terms of a fallback mode of a VUE using features or functions of only some, or one, of its component UEs.

A fallback UE or fallback mode may involve some level of aggregation of multiple component UEs, but fewer than all of the component UEs that were originally configured or available for a VUE. Although only one fallback UE or fallback mode is referenced above, a VUE may have more than one fallback UE or fallback mode that may be or become active under different operating conditions and/or other different parameters. A VUE may transition between progressively lower levels or degrees of UE aggregation as traffic drops, for example.

Another possible variation related to fallback is "fallforward", or transition from fallback UE or fallback mode toward a VUE with a higher level of UE aggregation, either in a single transition from fallback to VUE, or in multiple transitions or steps in the case of multiple fallback UEs or fallback modes. A VUE configuration could include a time offset, such as a time offset between data leaving an anchor point and being transmitted from the VUE. For example, there is a time gap between data leaving an anchor layer, or a DCI arrival, to data being transmitted. Such a time gap may be needed for a UE to coordinate dispatching data from an anchor layer and passing the data to its own lower layer and a lower layer at one or more different component UEs for transmission.

A time gap includes latency on a cross-link for relaying data between an SUE (or TUE) and a CUE within an VUE. Several cross-link examples are shown between the SUE and the CUE in FIGS. 3-6. Cross-link latency may depend on such factors or conditions as any one or more of the protocol, bandwidth, and data rate on the cross-link. A time gap or latency, such as a maximum expected latency for example, may be reported to a network device such as a gNB. Reporting of a time gap to a network device may performed at the same time as, or as part of, UE or VUE capability reporting. Cross-link latency, such as maximum expected latency as noted above, may also or instead be reported to a master UE, SUE, or TUE when forming a VUE.

A time gap may account for other time delays in addition to or instead of cross-link latency, such as other contributors to VUE internal data processing time or latency. Reporting of a time gap, and other time gap related features disclosed herein, are not limited only to time gaps that include cross-link latency.

Figure 10A:
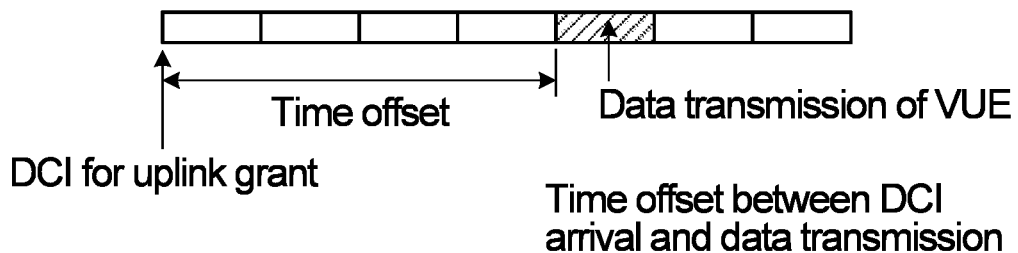
FIG. 10A is a block diagram illustrating a time offset between downlink control information (DCI) arrival and data transmission.

To accommodate a time gap for VUE internal data processing and relaying, which may include cross-link latency and/or other time delays or latency, a time offset may be configured or dynamically indicated to specify timing for data transmission. In some embodiments, the time offset is defined as an offset between DCI arrival and corresponding data transmission from a VUE, as shown in FIG. 10A.

Any of several different types of time offsets may be configured or dynamically indicated for data transmission and feedback. For example in FIG. 10A, of a time offset between DCI arrival and data transmission from the VUE, may apply to uplink communications, in which an uplink grant for the VUE is received in DCI.

Figure 10B:
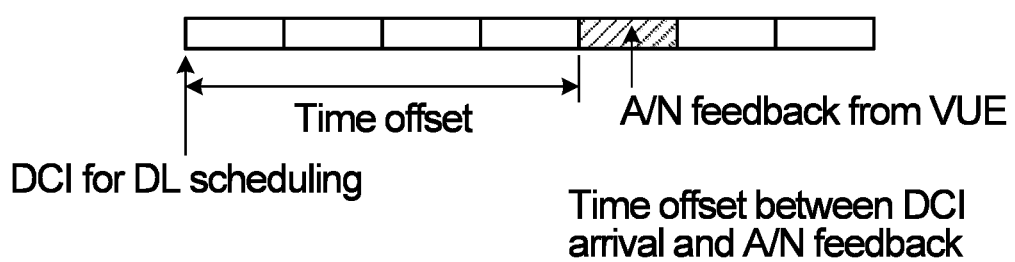
FIG. 10B is a block diagram illustrating a time offset between DCI arrival and acknowledgement (ACK)/negative acknowledgement (NACK) feedback.

FIG. 10B is a block diagram illustrating a time offset between DCI arrival and acknowledgement (ACK)/negative acknowledgement (NACK) feedback from the VUE, shown in the drawing as A/N feedback, and may apply to downlink communications in which downlink scheduling for the VUE is received in DCI.

For dynamic scheduling (dynamic grant or DG), a time offset or its indication, such as an index to a pre-defined time offset table, could be carried in DCI.

Figure 10C:
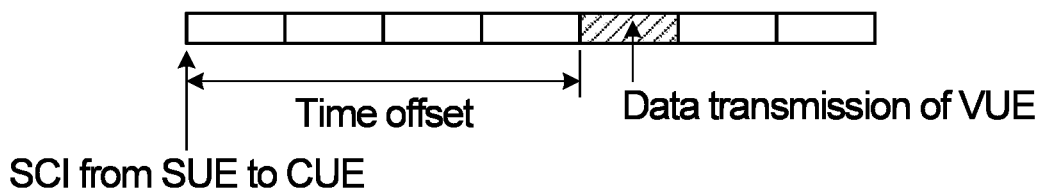
FIG. 10C is a block diagram illustrating a time offset between sidelink control information (SCI) and data transmission.

Other embodiments related to time offsets are also possible. For example, if configured grant (CG) is used for uplink data transmission, then a time offset could be used to indicate time offset from data leaving an anchor point to data being transmitted by the VUE. The time offset could be defined as the offset between transmission of a control signal, in SCI from an SUE to a CUE for example, to indicate the dispatch of data from the anchor point in the SUE, and transmission of the data by the CUE (or VUE). FIG. 10C is a block diagram illustrating an example of such a time offset between SCI and data transmission.

In general, a time offset could be applied by one or more component UEs in a VUE to align or otherwise coordinate their data transmissions at the same time for such purposes as joint scheduling or feedback. Also, although the examples above refer primarily to time gap or time offset reporting, more generally a time gap or time offset, such as a maximum expected time gap or time offset, could be configured as part of VUE configuration or reported as part of VUE capability.

A VUE may be configured or formed separately for downlink and uplink. For example, a VUE could be configured to support uplink only, downlink only, or both uplink and downlink. For uplink and downlink, a VUE may have different capabilities, in respect of number of antennas, maximum MIMO layers, and/or other parameters.

Figure 11:
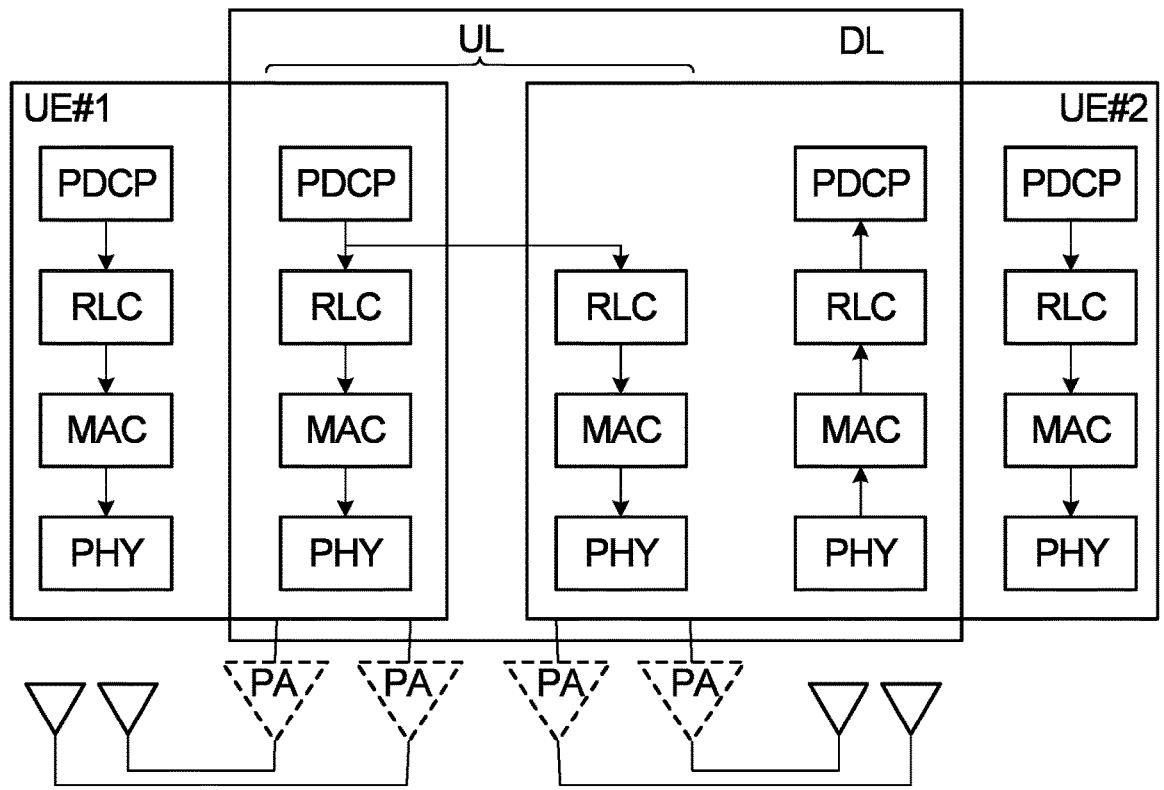
FIG. 11 is a block diagram illustrating an example VUE for both uplink and downlink.

FIG. 11 is a block diagram illustrating UE aggregation (for a VUE) for both uplink and downlink. Protocol stacks and RF chains including such elements power amplifiers (PAs) and antennas in UE #1 and UE #2 are shared with the VUE for uplink communications, and another protocol stack in UE #2 is shared with the VUE for downlink communications. As noted elsewhere herein, a VUE may instead be configured or formed only for uplink or only for downlink.

Figure 12:
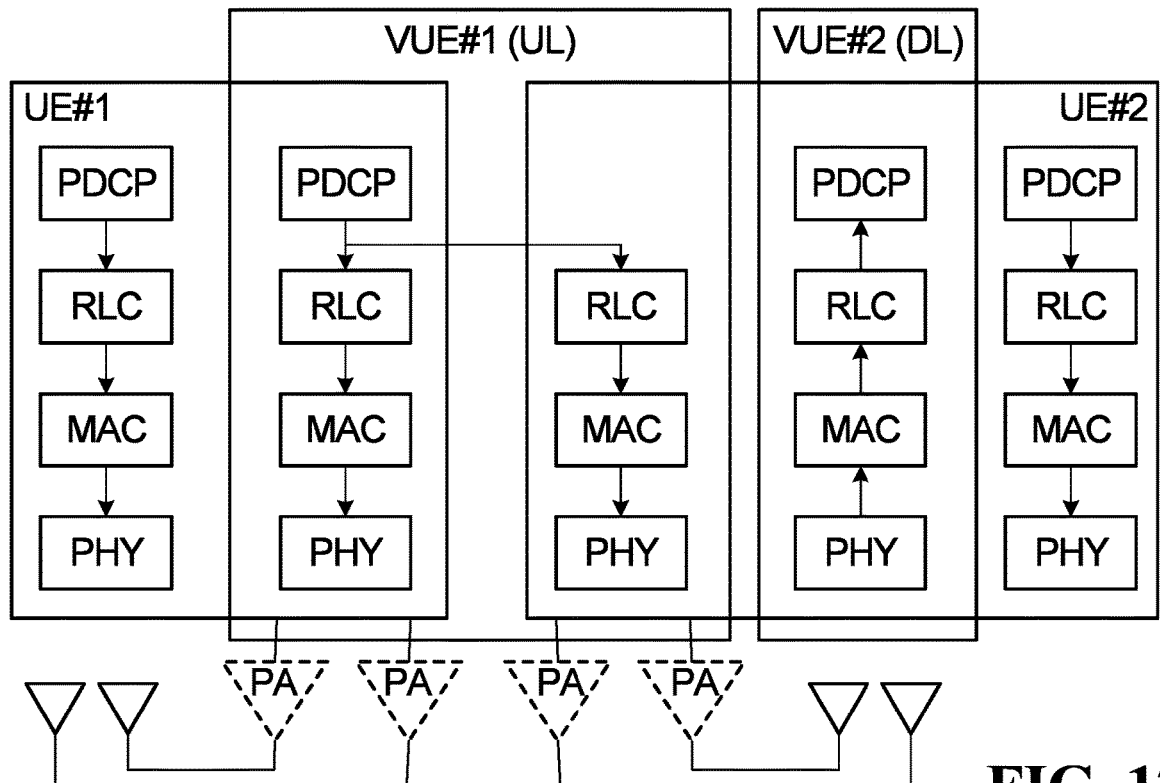
FIG. 12 is a block diagram illustrating different example VUEs for uplink and downlink.

In another embodiment, different VUEs are configured or formed for uplink and downlink, respectively. FIG. 12 is a block diagram illustrating different VUEs for uplink and downlink. In the example shown, a first VUE #1 is for uplink, and a second VUE #2 is for downlink. The two VUEs in FIG. 12 may be assigned different identifiers, such as VUE #1 with RNTI xxxx and VUE #2 with RNTI yyyy.

The SUE or TUE within a VUE could be pre-configured or dynamically selected.

Figure 13:
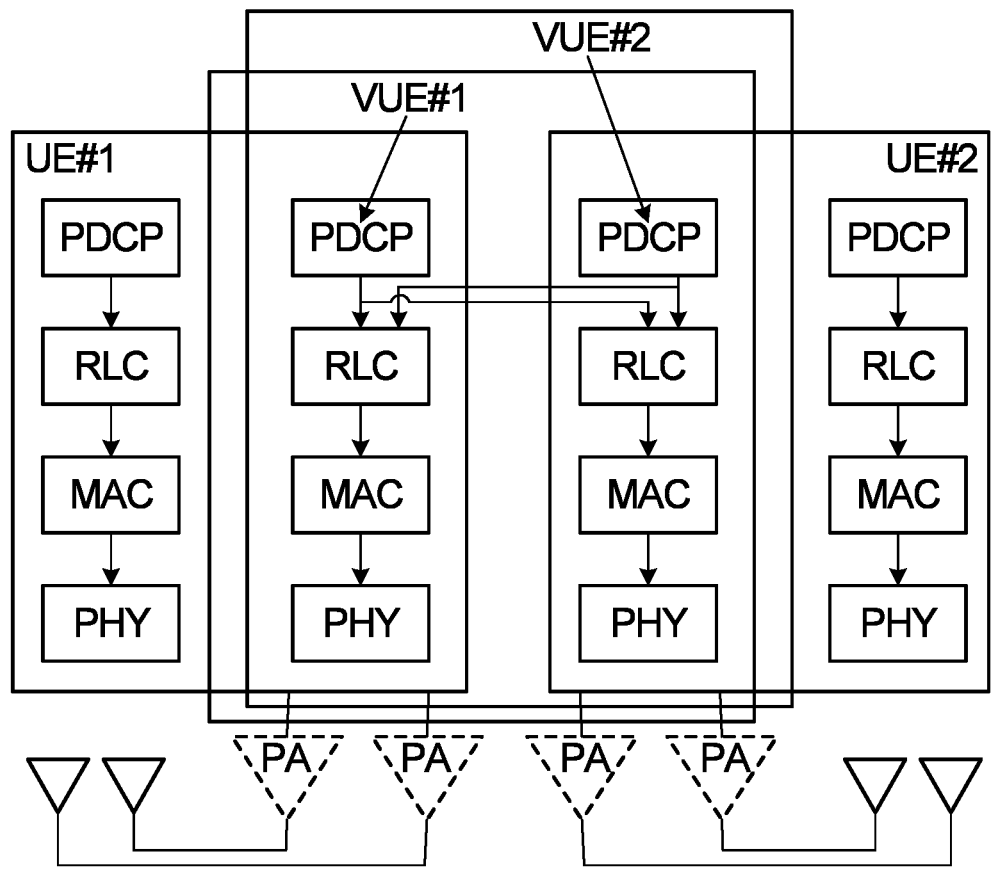
FIG. 13 is a block diagram illustrating respective example VUEs configured with different UEs as source UEs.

In an embodiment, a VUE is configured or formed on a per-SUE or per-TUE basis, such that the SUE or TUE is fixed in a VUE. For example, as shown in FIG. 13, VUE #1 is configured or formed with UE #1 as the SUE and VUE #2 is configured or formed with UE #2 as the SUE. This is an illustrative example, and in other embodiments either or both of UE #1 and UE #2 may be a TUE.

According to another embodiment, the SUE or TUE in a VUE could be alternated or selected among component UEs, on per-transmission basis for example. SUE or TUE information could be carried by physical layer or higher layer information, such as in a header. For example, a MAC header could be used to indicate the SUE or TUE of a VUE. As another example, an indicator in DCI could indicate to the VUE which component UE is the SUE or TUE within in the VUE for a particular transmission, which may be an uplink transmission or a downlink transmission.

Configuring or forming a VUE may bring any of several benefits.

For example, a VUE could be configured or formed to improve throughput and transmit large amounts of data and time sensitive data (e.g., URLLC traffic), while each individual UE (SUE or CUE) could also transit data, such as smaller amounts data or data that is not time sensitive.

Figure 14:
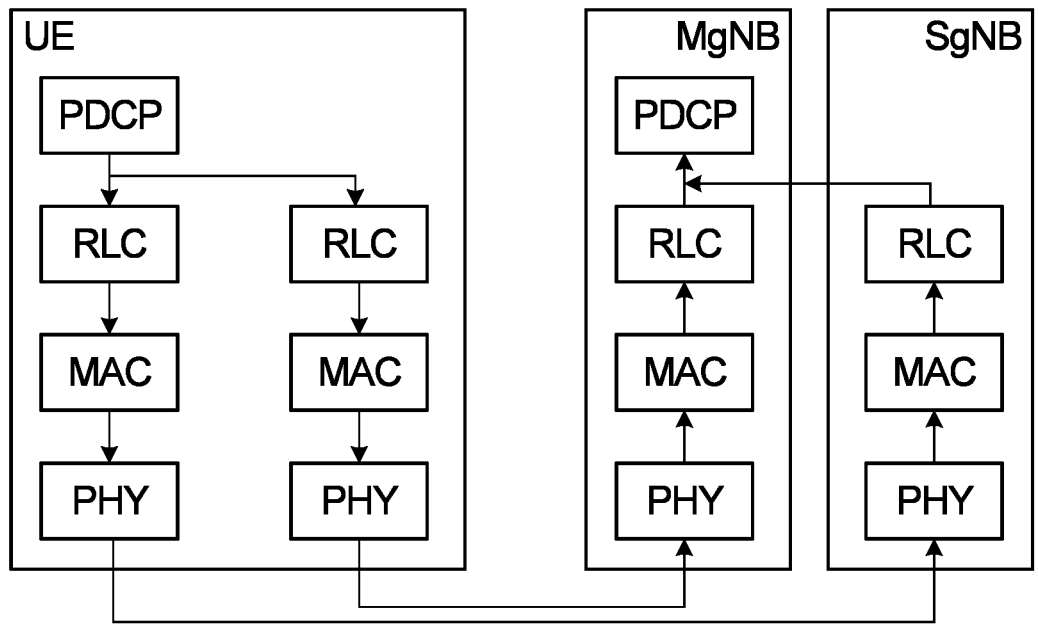
FIG. 14 is a block diagram illustrating a dual connectivity (DC) protocol stack.
Figure 15:
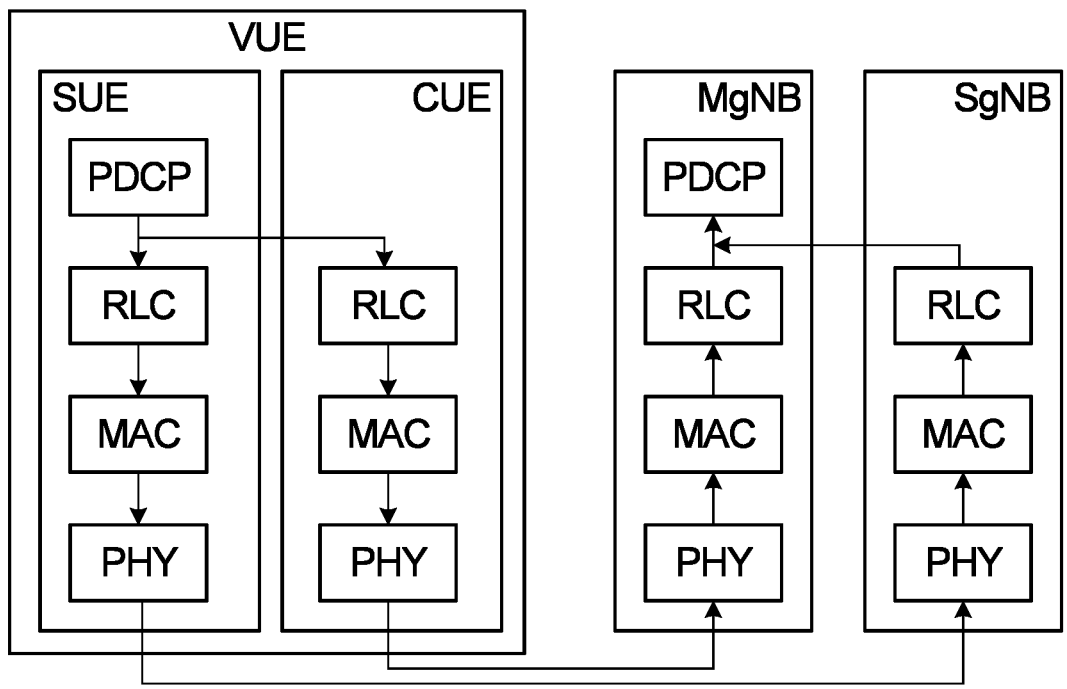
FIG. 15 is a block diagram illustrating an example VUE protocol stack with an anchor point.

FIG. 14 is a block diagram illustrating a DC protocol stack, and FIG. 15 is a block diagram illustrating an example VUE protocol stack with an anchor point at the PDCP layer. As compared with the DC protocol stack in FIG. 14, a VUE supporting a PDCP split as shown in FIG. 15 not only may have dual connection gain (dual band), but also may have extra transmit power and/or diversity gain from aggregating two different UEs into a VUE rather than using a single UE for DC with different network devices such as the master and secondary gNBs (MgNB, SgNB in FIGS. 14 and 15). Regarding transmit power for example, a single individual UE in FIG. 14 may have less total available transmit power than the two component UEs in FIG. 15. A single individual UE may also or instead be subject to a maximum transmit power restriction, whereas a VUE with two component UEs as in FIG. 15 may be subject to the same transmit power restriction but on a per-UE basis, in effect allowing the VUE in FIG. 15 to potentially transmit at much higher power than a single-UE DC implementation as in FIG. 15.

Figure 16:
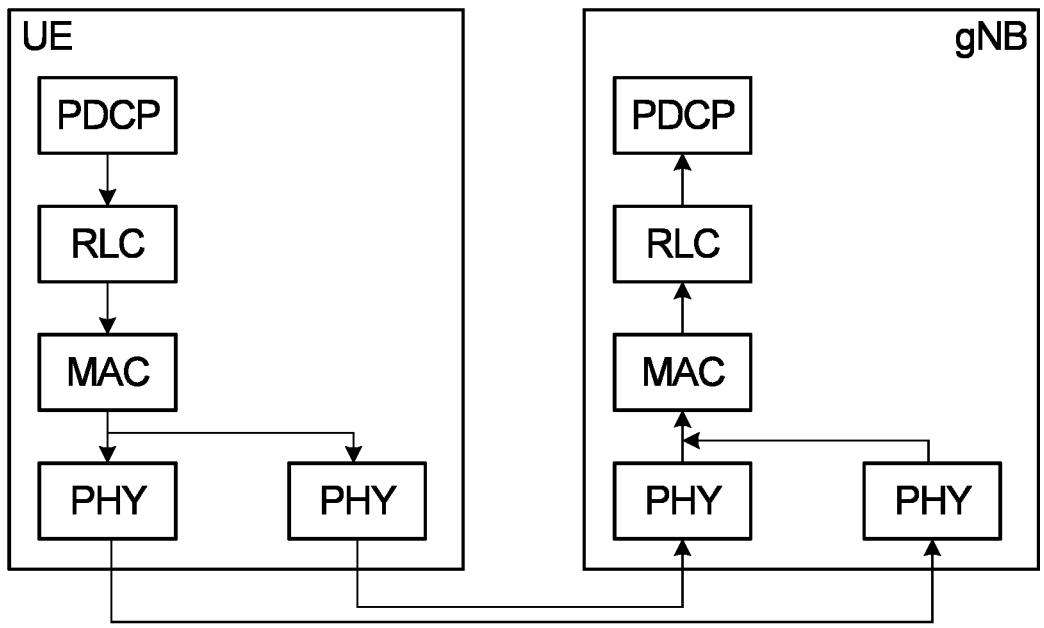
FIG. 16 is a block diagram illustrating a carrier aggregation (CA) protocol stack.
Figure 17:
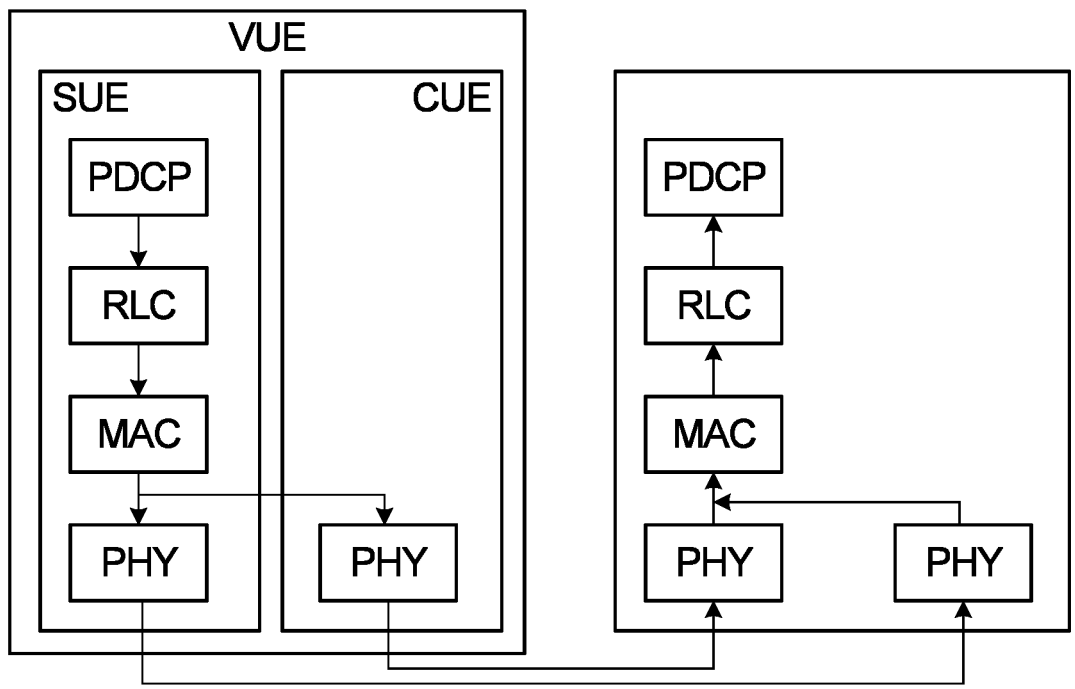
FIG. 17 is a block diagram illustrating another example VUE protocol stack with an anchor point.

FIG. 16 is a block diagram illustrating a CA protocol stack, and FIG. 17 is a block diagram illustrating an example VUE protocol stack with an anchor point at the MAC layer. As compared with the CA protocol stack in FIG. 16, a VUE supporting a data split at the MAC layer not only may have CA gain (dual component carrier) but also may have extra transmit power and/or diversity gain from aggregating two different UEs into a VUE rather than using a single UE for CA.

A VUE may also or instead have benefits in respect of MIMO, in that a VUE may have extra MIMO gain as a result of using more transmit antennas than a single-UE implementation. Additional transmit power may be available or permitted as a result of aggregating multiple component UEs into a VUE.

Flexible protocol stack configuration or allocation is another possible benefit of VUE embodiments. For example, different anchor points within different protocol stacks may provide different VUE capabilities, as described by way of example at least above with reference to FIGS. 3 to 6, 15, and 17.

The present disclosure also contemplates VUE scheduling.

Figure 18:
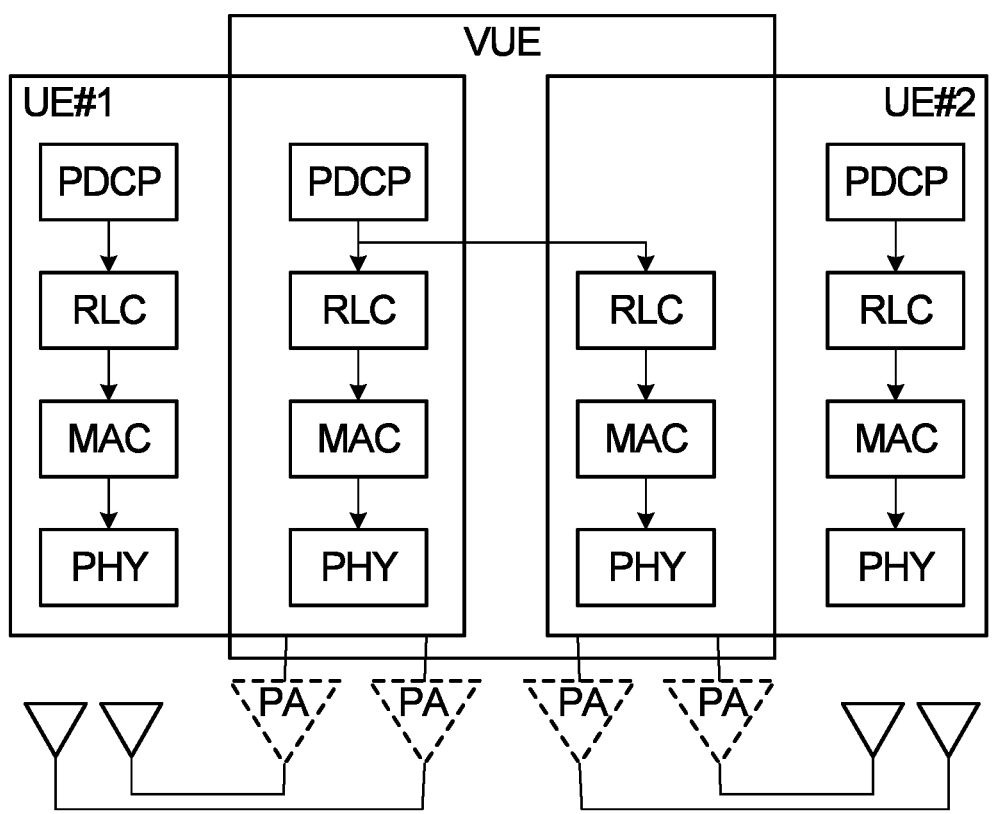
FIG. 18 is a block diagram of an example VUE in which component UEs share RF chains including power amplifiers (PAs) and antennas with a VUE.

FIG. 18 is a block diagram of an example VUE in which component UEs share RF chains including PAs and antennas with the VUE. In the example shown, each component UE shares its respective RF chain and antennas with the VUE. In this case, to increase or potentially maximize transmit power for example, scheduling of the VUE and its component UEs (UE #1 and UE #2) may use time division multiplexing (TDM) as shown by way of example in FIG. 19A.

In an embodiment, a TDM time resource allocation pattern for a VUE and its component UEs is configured by a network device such as a gNB and is signaled to the VUE and/or to each component UE. For example, configured grant (CG) transmission could be configured based on such a TDM time resource pattern.

According to another embodiment, a time resource for a VUE or each component UE is scheduled dynamically, and the VUE or each component UE could monitor for their scheduling, by monitoring physical downlink control channel (PDCCH) to check the time resource for their scheduling for example.

Time resource allocation could be based on time units such as units of slots, mini-slots, or symbols in time, for example.

Flexible scheduling for a VUE and its component UE(s) may maximize or at least improve transmit power of the VUE and the component UE(s), by not scheduling them to transmit or receive in the same time slots or otherwise at the same time.

The data transmitted from each component UE of the VUE could be scheduled together or separately. Scheduling for a VUE is in addition to any scheduling of each individual UE using each UE's own RNTI or other individual UE identifier. VUE scheduling, which may involve scheduling the component UEs together or separately, uses an RNTI or set of RNTIs or other identifier(s) assigned to the VUE.

If component UEs are scheduled together, then the same DCI, which may be referred to as joint DCI, may be used to schedule both component UEs for a VUE transmission. Separate DCI may be used if component UEs are scheduled separately for a VUE transmission. Separate DCI may be sent, for example, from different network devices such as different TRPs, from different cells, by different gNBs or using different carriers for example.

VUE scheduling options, to schedule component UEs together or separately, may be applied to VUEs with different anchor points, such as a VUE with a PDCP layer anchor point or a VUE with a MAC layer anchor point.

Other scheduling options are also possible. For example, FIG. 19B is a block diagram illustrating an example of scheduling according to another embodiment. TDM scheduling for a VUE and individual or non UE aggregation transmissions of component UEs is provided as an example in FIG. 19A and described at least above, and in FIG. 19B scheduling of time-frequency resources between component UEs for the VUE is at least partially non-TDM, in that both UE #1 and UE #2 are scheduled for VUE transmission in a first time slot in the example shown. In other time slots in FIG. 19B only one (or neither) of the two UEs is scheduled for the VUE.

Figure 19A:
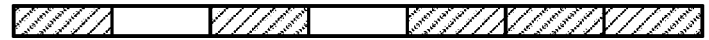
FIG. 19A is a block diagram illustrating an example of time division multiplexing (TDM) scheduling.
Figure 19B:
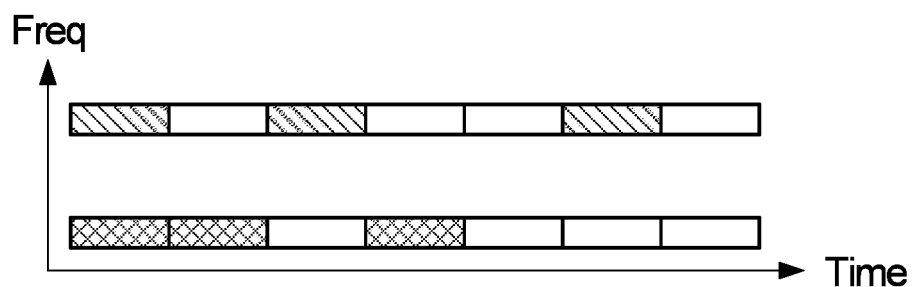
FIG. 19B is a block diagram illustrating an example of scheduling according to another embodiment.

FIG. 19A and FIG. 19B illustrate different aspects of scheduling. FIG. 19A illustrates VUE transmissions and transmissions by individual UEs (e.g. the SUE and the CUEs) are scheduled in TDM manner. FIG. 19B illustrates that when scheduling VUE transmissions, transmissions for each CUE could be scheduled separately, and do not need to follow TDM, which means that when VUE transmissions are scheduled, transmissions for each CUE can be scheduled at the same time. For example, for a VUE with DC and CA capability, transmissions for each CUE could be scheduled separately by different DCI and could be scheduled at the same time or at different times. As another example, for a VUE with enhanced MIMO capability, transmissions for each CUE could be scheduled by the same DCI together and at the same time, to form a joint MIMO transmission by all CUEs together Also, a DCI as referenced above is an example of a control signal or control signaling that may be used to schedule VUE transmissions. Resources could be scheduled or otherwise allocated to different CUEs using other types of signaling, such as higher layer signaling which may be similar to resource configuration used by CG.

Turning now to procedures for UE aggregation, these procedures could involve a network device configuring a VUE. A VUE could be configured for certain types of traffic. For example, a VUE may be configured to support transmission or reception of a large amount of data such as in video streaming or monitoring, and/or to support lower latency in such applications as URLLC or industrial internet of things (IIoT). A VUE could be used to transmit traffic at a higher data rate with improved coverage (e.g., enhanced mobile broadband (eMBB) and ultra-reliable low latency control (URLLC) traffic). These are examples of possible applications of VUEs, and others are possible.

Configuring a VUE could be initiated or triggered by a network device, such as a gNB, and forming a VUE and transmitting a VUE capability report could be initiated or triggered by a UE such as a master UE, SUE, or TUE. For example, a UE, such as a SUE or a MUE may form a VUE that includes the SUE and one or more CUEs based on the aggregate UE (VUE) configuration and report VUE capability to a network device (i.e. gNB).

In some embodiments, a VUE may be de-configured or otherwise disabled by either a network device such as a gNB, or by a master UE, an SUE, or a TUE.

For uplink, for example, a SUE, TUE, or MEU could transmit signaling to inform a gNB that the VUE is to be disabled or de-configured. Reasons for disabling or de-configuring a VUE may include any one or more of the following, or others: power limitation, insufficient power, or saving power; data to be transmitted is below a threshold, no (or below threshold amount of) data with a lower latency requirement; or an application that used the VUE (such as augmented reality (AR), virtual reality (VR), or gaming) is terminated. In this example, the gNB could then send signaling to de-configure or otherwise disable the VUE.

For downlink, a gNB could send signaling to a SUE, TUE, or MUE to disable or de-configure a VUE, due to any one or more of the following, and/or other conditions: traffic to be transmitted is below a threshold, to reduce interference, SUE, TUE or MUE request to disable the VUE.

A disabling/de-configuring message or signaling may be transmitted to a SUE, TUE, or MUE and conveyed by the SUE, TUE, or MUE to the CUE(s) of the VUE. In some embodiments, disabling/de-configuring message or signaling may be transmitted by a network device (e.g. gNB) to a SUE, TUE, or MUE of a VUE and each of the CUEs of the VUE.

After a VUE is disabled/de-configured, a VUE identity such as VUE RNTI and protocol stacks used may be considered released or otherwise become available for other uses.

Figure 20:
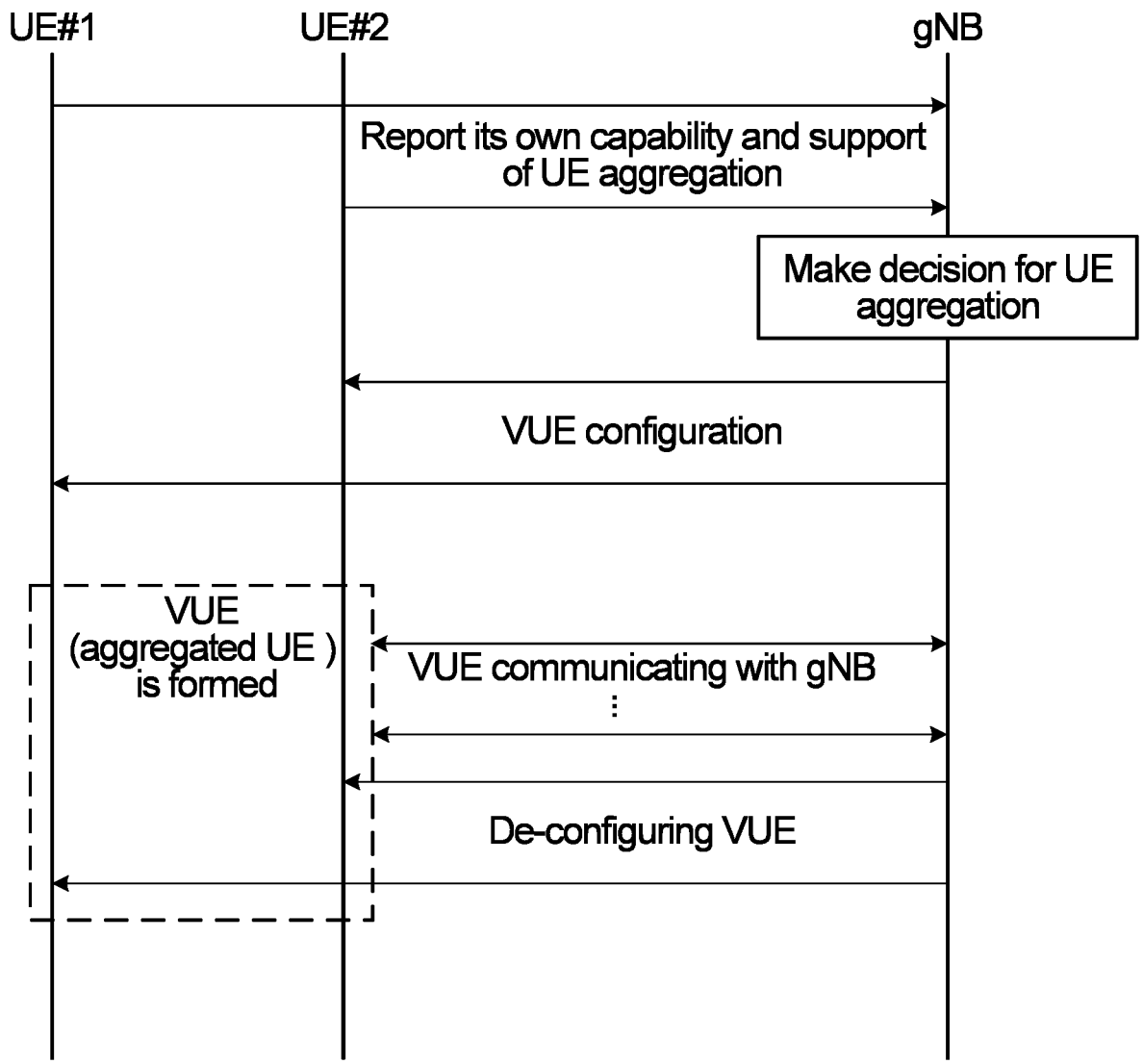
FIG. 20 is a signal flow diagram illustrating an example of signaling for UE aggregation according to an embodiment.

In some embodiments, a VUE configuration procedure involves a network device such as a gNB making a determination that a VUE is to be configured. FIG. 20 is a signal flow diagram illustrating an example of signaling for UE aggregation according to such an embodiment. The example of two UEs and a gNB in FIG. 20 is intended solely for illustrative purposes. Embodiments are not limited only to two UEs and a gNB.

In FIG. 20, each UE reports its own individual UE capability, and its capability for UE aggregation, to the gNB. Such capability reporting may be initiated or triggered by each UE, or in response to a request or other signaling (not shown) from the gNB. UE capability may include one or more parameters, properties, features, or functions, such as any one or more of the following illustrative examples: number of antennas, MIMO capability, and SL protocol or capability. SL protocol or capability may include, for example, any one or more of: Bluetooth™, WiFi, NR sidelink, and bandwidth support. Capability for UE aggregation may include, for example, any one or more of: information on a cross-link between UEs such as protocol used (WiFi, Bluetooth, sidelink), frequency and bandwidth, latency, etc.; anchor point for data split/aggregations/path switch, such as one of PDCP, RLC, MAC, or PHY layers in examples provided at least above; protocol stacks that could be shared between a VUE and the individual UE; antenna ports; power; and maximum MIMO layers.

A capability for UE aggregation may or may not be the same as UE capability, or in other words the capability for UE aggregation, as reported to a network device or another individual UE, may be different from the capability of the UE when the UE operates on its own. For example, a UE could report its capability as having 4 antennas in its UE capability assuming that the UE operates by itself, while the same UE may report 2 antennas as part of its capability for UE aggregation. Thus, a UE may share, lend, or contribute only some of its capabilities to a VUE.

UE capability for UE aggregation may not necessarily be uniform or fixed. For example, UE capability for aggregation need not be made available for both downlink and uplink communications, and could instead be shared with a VUE for downlink only or for uplink only. Similarly, UE capability for UE aggregation may vary with other parameters, and could be different for VUEs that are to be formed to assist different SUEs for example.

After the gNB receives the UE capability from the UEs, and in some embodiments in response to receiving such reports, a determination is made by the gNB as to whether a VUE can be or should be configured. In FIG. 20, the gNB may make a decision to pair or aggregate the two UEs together as a VUE. More generally, in some embodiments a network device may make a decision as to whether to aggregate two, or more, UEs together into a VUE. Any of various criteria may be used to determine whether a VUE is to be configured. A VUE decision or determination may be made, for example, based on the capability reporting and any one or more of: at least a certain number of UEs being available to share a capability such as they have no (or below a threshold amount of) traffic to transmit at the moment; they belong to the same user or same entity (owner, company, office etc.); and at least a certain amount of added capability being available for sharing with a VUE, such as at least a certain number of additional antennas or transmit power or processing capability. One or more other criteria may also or instead be used. Other examples of criteria that may be used in a VUE determination include: the UEs to be aggregated having good channel quality to a network device such as a gNB, the UEs to be aggregated having good channel quality (or cross-link) among themselves, or the UEs to be aggregated moving together.

In the event of a positive determination, a VUE is configured. The gNB sends information related to the VUE, also referred to generally herein as an aggregated VUE (or VUE) configuration, or a configuration for UE aggregation. A VUE configuration could indicate or include, for example, any one or more of the following:

an identifier or a set of identifiers such as an RNTI or set of RNTIs for the VUE;

traffic direction for the VUE, such as uplink only, downlink only, or both uplink and downlink;

identification of one or more of the component UEs of the VUE, such as an SUE for uplink or a TUE for downlink, and CUE(s);

one or more parameters of a cross-link, which may be a dedicated link, between component UEs that are part of the VUE, such as protocol, latency, data rate, carrier frequency, bandwidth, data error rate, modulation, etc.;

anchor point for data split/aggregations/path switch, such as one of PDCP, RLC, MAC, or PHY layer;

set of protocol stacks on component UE(s), for example for each radio bearer such as data radio bearer (DRB) or signal radio bearer (SRB) and/or multiple DRBs such as one DRB for each quality of service (quality of service)—more generally, when a VUE is to be configured, a set of protocol stacks may be configured for the VUE on the component UE(s), with one or more protocol stacks on each component UE being fully or partially shared with the VUE;

capability of VUE, such as CA, DC, or MIMO and related parameters;

shared protocol stacks with individual component UE(s);

sounding reference signal (SRS) information and/or demodulation reference signal (DMRS) information of the VUE, such as SRS and DMRS antenna ports;

maximum MIMO layers supported;

MIMO precoding operation to be applied on modulated symbols (using a precoding codeword for example), to offset channel distortion in an air interface.

For example, UE #1 could support transmission on carriers (or bandwidth parts (BWPs)) #1 and #2 as its own capability, but it could report in its capability for UE aggregation that it supports transmission for UE aggregation on carrier (or BWP) #1 only. Another UE #2 could support transmission on carrier (or BWP) #3 and #4 as its own UE capability, but it could report in its capability for UE aggregation that it supports transmission for UE aggregation on carrier (or BWP) #4 only. If a gNB or other network device determines that an aggregated UE could be configured with DC capability, then the configuration of the aggregated UE may contain a configuration of DC over carriers (or BWP) #1 and #4. Alternatively, if a network device such as a gNB determines that an aggregated UE could be configured with CA capability, then the configuration of the aggregated UE may contain a configuration of CA over carriers (or BWP) #1 and #4.

Reporting of respective contributions of individual UEs for a VUE may be important, for example, to enable a network device to track the additional capability, for CA/DC/MIMO for example, which is contributed by each individual UE in order to schedule data transmissions for each individual UE according to its committed capability. In the above example of carriers or BWPs, each individual UE may receive signaling indicating on which carrier or BWP to receive/transmit data for the VUE.

As noted elsewhere herein, different capability of a VUE such as DC or CA may be dependent on the location of the anchor point. In some embodiments, a VUE could be configured to support multiple capabilities or modes such as DC and CA together. Alternatively, multiple sets of VUE protocol stacks can be supported and configured. Higher layer signaling could be used to indicate each capability of the VUE or each set of VUE protocol stacks.

In some embodiments, more than one protocol stack sharing mechanism may be supported, and a protocol stack sharing type indication may be included in a VUE configuration.

Distribution of the VUE configuration and application of the VUE configuration by the component UEs forms the VUE, and communications between the VUE and the gNB may then take place.

In some embodiments, the VUE may be de-configured or otherwise disabled, and optional de-configuring of UE aggregation (VUE) by the gNB is shown in FIG. 20.

Fallback is another optional feature that may be provided in some embodiments.

Figure 21:
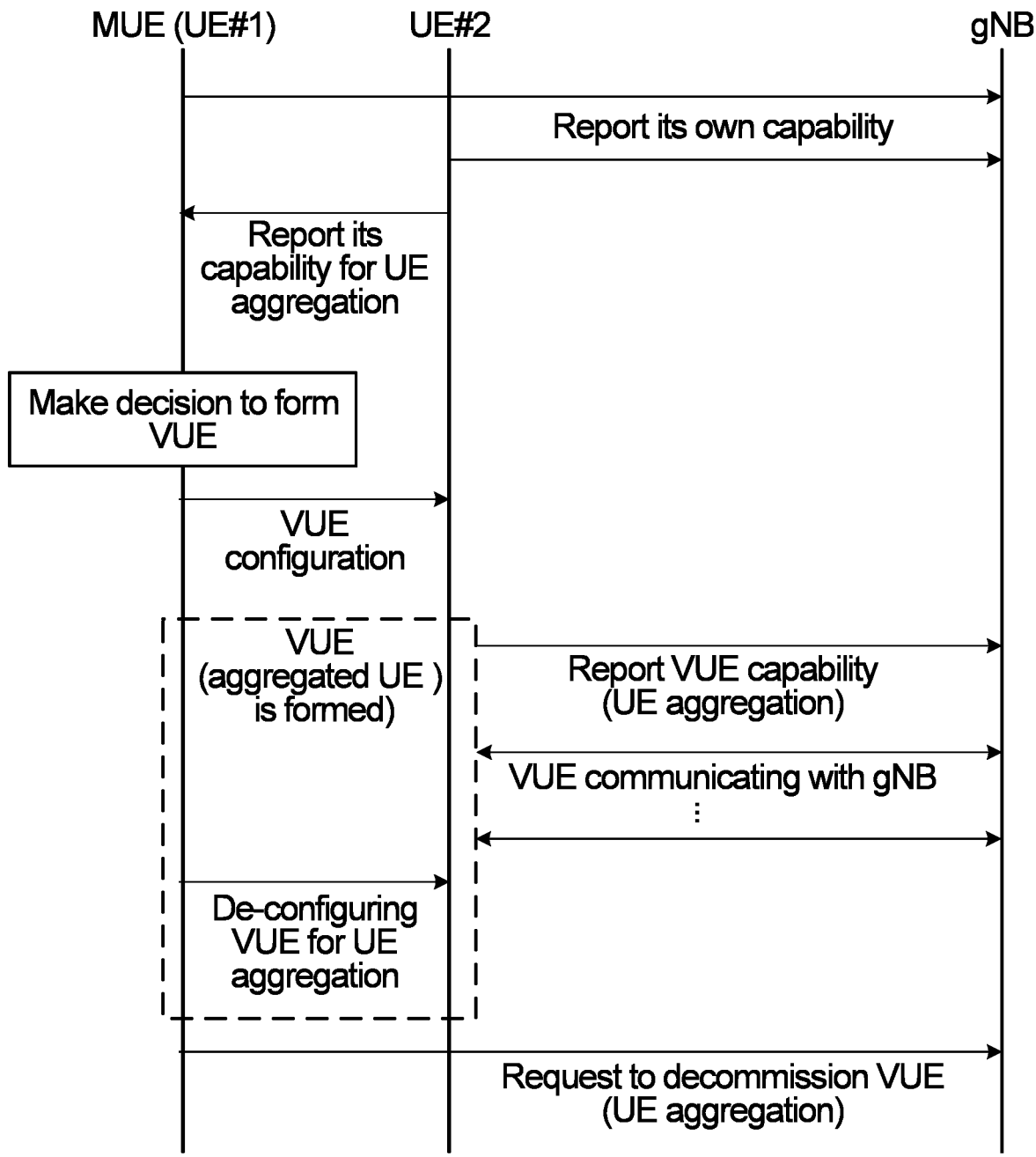
FIG. 21 is a signal flow diagram illustrating an example of signaling for UE aggregation according to another embodiment.

FIG. 21 is a signal flow diagram illustrating an example of signaling for configuring a VUE according to another embodiment, in which a UE makes a determination that a VUE is to be formed. The UE that makes the determination may be a master UE (MUE) for example, as shown in FIG. 21.

Each UE reports its own individual capability to a network device, shown by way of example as a gNB in FIG. 21. Each UE, other than a UE that will be making the VUE determination (the MUE in FIG. 21), reports its capability for UE aggregation to the MUE. Although the VUE determination is to be made by the MUE in FIG. 21, more generally one individual UE may make the determination, and need not necessarily be designated as a master UE.

After the MUE receives the capability report(s) from the other UE(s), of which there is one (UE #2) in the example shown, and in some embodiments in response to receiving such report(s), a determination is made by the MUE as to whether a VUE can be or should be formed. In the event of a positive determination, a VUE is formed. The MUE sends a VUE configuration to the other UE(s), again including UE #2 in the example shown.

Distribution of the VUE configuration and application of the VUE configuration by the component UEs, including the MUE and UE #2 in the example shown, forms the VUE. VUE capability is reported to the gNB by the VUE, and communications between the VUE and the gNB may then take place.

In some embodiments, the VUE, the MUE, or another component UE of the VUE may determine that the VUE is no longer needed, and may de-configure or otherwise disable the VUE. Such optional de-configuring of UE aggregation (VUE) is shown in FIG. 21. De-configuring or disabling of a VUE may be reported to a network device in any of various ways. FIG. 21 illustrates one example, in the form of a request to the gNB to decommission the VUE.

FIGS. 20 and 21 illustrate examples of multiple UEs communicating with a network device for configuring a VUE in accordance with embodiments of the present disclosure. Although these examples involve a determination or decision by different equipment or devices, in particular a network device and a UE, features that are described for a network-based approach with reference to FIG. 20 may also or instead apply to a UE-based approach as shown by way of example in FIG. 21.

For example, any of various criteria, including those described above with reference to FIG. 20, may be used by a UE to determine whether to configure a VUE. Capability and/or capability reporting described above with reference to FIG. 20 may also or instead be implemented in a UE-based VUE configuration procedure such as the example shown in FIG. 21. Similar comments apply in respect of embodiments described above in respect of a VUE configuration. Fallback is another option described with reference to FIG. 20 that may also or instead be provided in some embodiments of UE-based VUE configuration as shown by way of example in FIG. 21.

The examples shown in FIGS. 20 and 21 are illustrative of procedures for UE aggregation, which provide flexible ways to form a VUE from both a network side and a UE side.

FIGS. 20 and 21 are intended to be non-limiting examples of embodiments consistent with the present disclosure. Such embodiments include methods for UE aggregation that include configuring a VUE. Configuring a VUE includes communicating, by, a VUE configuration for UE aggregation. A VUE configuration is also referred to herein as an aggregated UE configuration or a configuration for UE aggregation.

In some embodiments, a VUE configuration may indicate a set of protocol stacks, and an anchor point.

In an embodiment that involves a network device configuring a VUE, communicating the VUE configuration may involve transmitting the VUE configuration by the network device. For example, a method consistent with the present disclosure may involve transmitting, by a network device to a plurality of UEs that are capable of UE aggregation, a configuration for UE aggregation. UE capability for UE aggregation may, for example, be transmitted to a network device by one or more of the plurality of UEs.

More generally, a method may involve transmitting, by an apparatus to a plurality of UEs, a configuration for UE aggregation. The configuration may indicate that the plurality of UEs are to participate in UE aggregation, and indicate a first UE for splitting or combining data. The transmitting apparatus may be, for example, a network device, the first UE, or another UE that may or may not necessarily be participating in the UE aggregation.

A method may also involve communicating, by the network device for example, data with a VUE in accordance with the VUE configuration. For example, a result of UE aggregation may be a VUE that has its own identifier for operation in the network, and communicating data may involve any one or more of: receiving data from the VUE or transmitting data to the VUE.

More generally, communicating data may involve communicating data between a network device and a first UE in accordance with the configuration for UE aggregation. This communicating involves or uses the plurality of UEs participating in UE aggregation, and each UE communicates data in accordance with the configuration. For example, communicating data in accordance with a configuration for UE aggregation may involve transmitting the data, which has been split at (or by) the function of the first UE, or in other words after splitting the data at (or by) the first UE or after the data has been split at (or by) the first UE, to the network device through different paths. Each participating UE transmits split data through one of the paths, and each path involves at least one respective UE and possibly more than one UE of the plurality of UEs, including the first UE. This is illustrative of uplink transmission of the data to the network device. As another example, for downlink reception of the data from the network device, communicating the data in accordance with the configuration for UE aggregation may involve aggregating or combining, at the function of the first UE, the data received from the network device through different paths. Each participating UE receives data that is to be aggregated or combined, and the first UE receives the data through different paths. In other words, from the perspective of the first UE, communicating the data in the case of downlink reception involves receiving from a network device, through different paths, the data for aggregating or combining at (or by) the first UE. Each of the different paths involves at least one respective UE and possibly more than one UE of the plurality of UEs, including the first UE.

Communicating data may also or instead involve either or both of downlink transmission and uplink reception. For downlink transmission, communicating data in accordance with a configuration for UE aggregation may involve transmitting the data, which has been split at (or by) a network device, or in other words after splitting the data at (or by) the network device or after the data has been split at (or by) the network device, to the first UE through different paths. Each participating UE that is in a path between the network device and the first UE transmits split data through one of the paths, and each path involves at least one respective UE and possibly more than one UE of the plurality of UEs, including the first UE. For uplink reception of the data by the network device, communicating the data in accordance with the configuration for UE aggregation involves aggregating or combining, at the network device, the data received from the first UE through different paths. Each participating UE transmits data that is to be aggregated or combined, and the network device receives the data through different paths. In other words, from the perspective of the network device, communicating the data in the case of uplink reception involves receiving from the first UE, through different paths, the data for aggregating or combining at (or by) the network device. Each of the different paths involves at least one respective UE and possibly more than one UE of the plurality of UEs, including the first UE.

For uplink or downlink, each of the different paths includes or involves respective UEs of the plurality of UEs that are participating in UE aggregation. Any path may include or involve one, or more than one, of the UEs.

The anchor point referenced herein is a point at which the data is split or otherwise distributed between protocol stacks at a transmit side, or aggregated or combined from protocol stacks at a receive side. In some embodiments, data is distributed between respective protocol stacks of multiple UEs for transmission, to enable increased transmit power in communicating the data for example. As described at least above, an anchor point is a function that is located, supported, or operated in one layer of the protocol stack for each individual UE, and therefore more generally an anchor point may also or instead be referred to as a function, for splitting or aggregating data as disclosed elsewhere herein. Some embodiments are described in the context of a VUE configuration including or indicating protocol stacks and an anchor point. More generally, a configuration for UE aggregation may not only include or indicate protocol stacks for UEs to participate in UE aggregation, but also indicate a function of a first UE for splitting or aggregating data. Such a function may support or embody any one or more of the anchor point features disclosed herein.

An anchor point may be at or in a layer of a protocol stack, and examples disclosed elsewhere herein include an anchor point in a PDCP layer, an RLC layer, a MAC layer, or a PHY layer. These example anchor points, or similarly functions for splitting or aggregating data, may provide different features depending on where an anchor point or function operates. As described at least above, an anchor point may be at or in a layer of a protocol stack, such as in a PDCP layer, an RLC layer, a MAC layer, or a PHY layer. Similarly, a function for splitting or aggregating data, or more generally splitting and combining may operate at or in a layer of a protocol stack of a UE, such as in one of a PDCP layer, an RLC layer, a MAC layer, or a PHY layer.

An anchor point or function that operates in the PDCP layer, for example, may enable a dual connectivity capability for the VUE, or more generally enable a multiple connectivity capability using UEs that participate in UE aggregation. An anchor point or function that operates in the MAC layer may enable a carrier aggregation capability from the VUE, or more generally enable a carrier aggregation capability using the plurality of UEs. An anchor point or function that operates in the MAC layer or the PHY layer may enable a MIMO capability for the VUE, or more generally enable enhanced MIMO capability using the plurality of UEs. Enabling an enhanced MIMO capability may include providing an enhanced MIMO capability relative to a MIMO capability of one or more of the UEs that already have a MIMO capability. Put another way, the plurality of UEs may be enabled with: a multiple connectivity in a case that the splitting and combining are operated in the PDCP layer, a carrier aggregation in a case that the splitting and combining are operated in the MAC layer, or enhanced MIMO in a case that the splitting and combining are operated in the PHY layer.

Communicating an aggregated UE (or VUE) configuration, or a configuration for UE aggregation, in the context of a network device configuring a VUE, may involve transmitting the configuration to a plurality of multiple UEs. An illustrative example is shown in FIG. 20. For network-configured UE aggregation, communicating a configuration by a network device involves transmitting the configuration. One or more of the UEs involved in the UE aggregation may receive the configuration from the network device.

In some embodiments, a method may involve either or both of transmitting receiving capability information indicating the capability of UE aggregation from the plurality of UEs. In the case of the first UE being the apparatus transmitting the configuration, capability information may be transmitted by and received from other UEs of the plurality of UEs. In the case of the apparatus being a network device or a UE that is not to participate in the UE aggregation, capability information may be transmitted by and received from the plurality of UEs, including the first UE.

Some embodiments may provide a fallback feature, and an aggregated UE (or VUE) configuration, also referred to as a configuration for UE aggregation, may also indicate a fallback UE or fallback mode that involves a subset of the multiple UEs that are capable of UE aggregation. A method may also involve transmitting signaling to provide an explicit or implicit indication of switching between the UE aggregation and the fallback UE or fallback mode. Examples of explicit and implicit indication are provided elsewhere herein. Such signaling may be transmitted to one or more of the multiple UEs by a network device, for example.

The present disclosure also encompasses communicating data according to scheduling for an aggregate UE (or VUE). In some embodiments, the scheduling uses TDM for the UE aggregation and individual or non UE aggregation transmissions of the multiple UEs that participate in UE aggregation.

An aggregate UE (or VUE) configuration or a configuration for UE aggregation need not be fixed or static. For example, a network device may use signaling to communicate with a first UE that is included in a VUE (e.g. the SUE or TUE) to disable an aggregated UE (or VUE) configuration or a configuration for UE aggregation. An example such signaling is shown in FIG. 20 for de-configuring a VUE. Thus, a method may involve transmitting, by a network device for example, signaling to disable a configuration for UE aggregation.

As described at least above, a configuration for UE aggregation may include protocol stacks for UEs to participate in UE aggregation. The protocol stacks may operate over the plurality of UEs with the splitting and combining operating on the first UE, for example. The protocol stacks may include a set of protocol stacks that is shared by one of the UEs for UE aggregation communications (transmission and/or reception) and individual UE (non UE aggregation) communications, including transmission and/or reception. Protocol stack sharing is illustrated by way of example in FIG. 7.

Methods that involve transmitting a configuration for UE aggregation may be implemented or performed by a network device, as in FIG. 20 for example, or by a UE, as in FIG. 21 for example. Thus, an apparatus that transmits a configuration for UE aggregation may be a network device, the first UE, or another UE. The first UE may itself transmit the configuration, and therefore might not necessarily be one of the plurality of UEs to which the configuration is transmitted.

In a network-configured embodiment, a method performed by a UE may include receiving, from a network device, an aggregated UE (or VUE) configuration. In other embodiments in which a UE makes a determination regarding UE aggregation, as in FIG. 21 for example, a UE such as the MUE in FIG. 21 may transmit an aggregated UE configuration to another UE, such as UE #2 in FIG. 21. UE #2 may receive the aggregated (or VUE) configuration. Thus, configuring a VUE is not limited to network-configured UE configuration embodiments, or a network device transmitting an aggregated (VUE) configuration. Thus, more generally, a method may involve receiving, by a UE from an apparatus, a configuration for UE aggregation. The configuration may include protocol stacks for a plurality of UEs including the UE to participate in UE aggregation, and indicate a function of a first UE of the plurality of UEs for splitting or aggregating data. In some embodiments, the configuration indicates that the UE is to participate as one of a plurality of UEs in UE aggregation, and indicates a first UE for splitting or combining data. The plurality of UEs may include at least the first UE and the UE that receives the configuration.

A method may also involve communicating data, in the wireless communication network, in accordance with the UE aggregation or the configuration for UE aggregation. For example, a result of UE aggregation may be an aggregated UE or VUE that has its own identifier for operation in the network, and from a UE perspective communicating data in accordance with the UE aggregation may involve any one or more of: transmitting data from the aggregated UE, or receiving data by the aggregated UE. All of the data, or a part of the data, may be communicated between the network device and the first UE. For example, the first UE for splitting or combining data may be involved in communicating all of the data, whereas other individual UEs that participate in the UE aggregation may be involved communicating respective parts of the data.

In some embodiments, data is distributed between respective protocol stacks of multiple UEs for transmission, to enable increased transmit power in communicating the data.

In some embodiments, communicating the data in accordance with the configuration for UE aggregation involves transmitting the data, which has been split at the function of the first UE, or in other words after splitting the data at the first UE or after the data has been split at the first UE, to the network device through one of multiple different paths. From the perspective of a participating UE other than the first UE, communicating the data may also or instead involve receiving from the network device, through one of multiple different paths, the data to be aggregated or combined at the function of the first UE, or in other words the data for aggregating or combining at the first UE. From the perspective of the first UE, communicating the data may also or instead involve receiving from the network device through multiple different paths, the data to be aggregated or combined at the function of the first UE, or in other words the data for aggregating or combining at the first UE. Each of the multiple different paths includes or involves at least one respective UE of the plurality of UEs, including the first UE, that are participating in UE aggregation.

An anchor point, or more generally the function for splitting or aggregating the data may be at or in, or operating at or in, a layer of a protocol stack. Examples disclosed elsewhere herein include an anchor point in, or a function that operates in, a PDCP layer (to provide or enable a DC capability or more generally a multiple connectivity capability for example), an RLC layer (to provide or enable a CA capability for example), a MAC layer (to provide or enable a CA capability or a MIMO capability for example), or a PHY layer (to provide or enable a MIMO capability for example). In other words, the splitting and combining may be operated in one of a PDCP layer, an RLC layer, a MAC layer, or a PHY layer, and the plurality of UEs may be enabled with: multiple connectivity in the case that the splitting and combining are operated in the PDCP layer, carrier aggregation in the case that the splitting and combining are operated in the MAC layer, or enhanced MIMO in the case that the splitting and combining are operated in the PHY layer.

A method may involve transmitting capability information indicating the capability of UE aggregation to the apparatus from which a UE receives the configuration. The apparatus may be a network device, another UE of the plurality of UEs that are to participate in UE aggregation, or a UE that is involved in configuring but not participating in UE aggregation.

Fallback may be provided in some embodiments, and the VUE configuration or configuration for UE aggregation may also indicate a fallback UE or fallback mode that involves a subset of the multiple UEs to be aggregated to form the VUE or a subset of the UEs participating in UE aggregation. A method may involve receiving, by one or more of the UEs of the VUE or UEs participating in UE aggregation, signaling to provide an explicit or implicit indication of switching between the UE aggregation and the fallback UE or fallback mode. Examples of explicit and implicit indication are provided elsewhere herein.

Data may be communicated by the multiple UEs or a VUE according to scheduling for UE aggregation or an aggregated UE. Thus, a method may involve communicating the data according to scheduling for UE aggregation transmission and/or reception. In some embodiments, the scheduling uses TDM for the UE aggregation and individual (non UE aggregation) transmissions of the multiple UEs.

A method may include involve communicating, in the wireless communication network, signaling to disable the UE aggregation. Illustrative examples of such signaling are shown in FIG. 21 for de-configuring and decommissioning a VUE.

As in other embodiments, the configuration may indicate protocol stacks to operate over the plurality of UEs with the splitting and combining operating on the first UE. The protocol stacks may include a set of protocol stacks that is shared by a UE for UE aggregation communications and non UE aggregation communications.

The foregoing method features are illustrative of features that may be provided in some embodiments. Other features disclosed herein may also or instead be provided. For example, the respective protocol stacks for UE aggregation may include a protocol stack that is shared by one of the multiple UEs for the UE aggregation. As noted elsewhere herein, protocol stacks may include fully or partially shared protocol stacks that are shared by a UE for UE aggregation, and dedicated or non-shared protocol stacks.

Many other features disclosed herein, with reference to UE aggregation configuration embodiments or other embodiments, may be provided.

Embodiments are described above primarily in the context of example methods. Other embodiments are also possible.

Figure 22A:
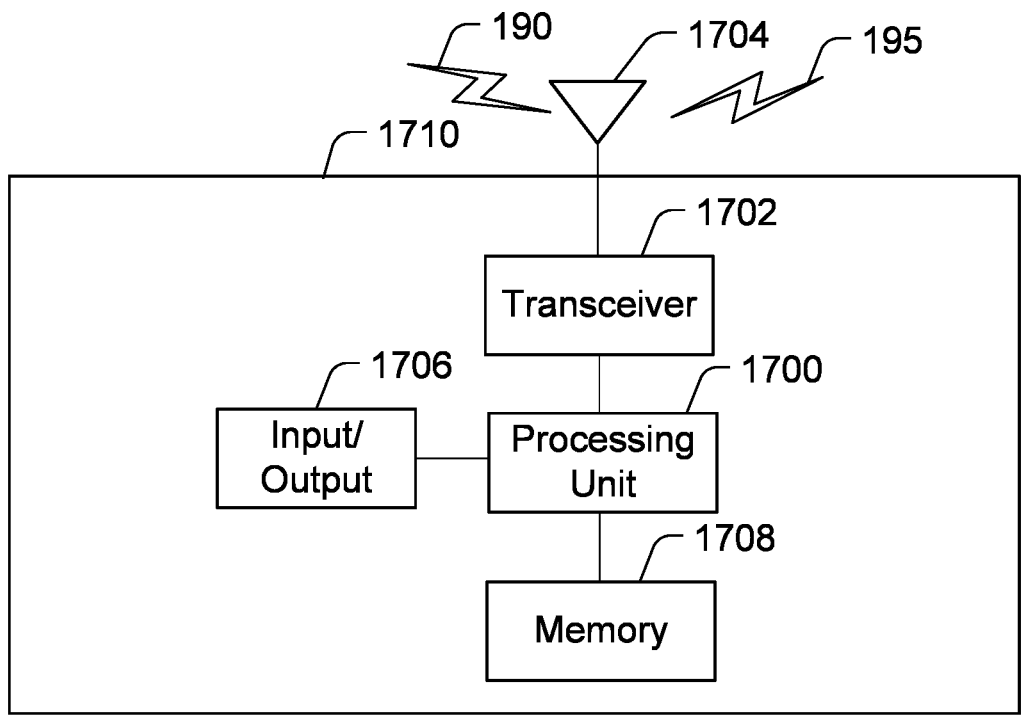
FIGS. 22A and 22B are block diagrams illustrating example devices that may implement the methods and teachings according to this disclosure.
Figure 22B:
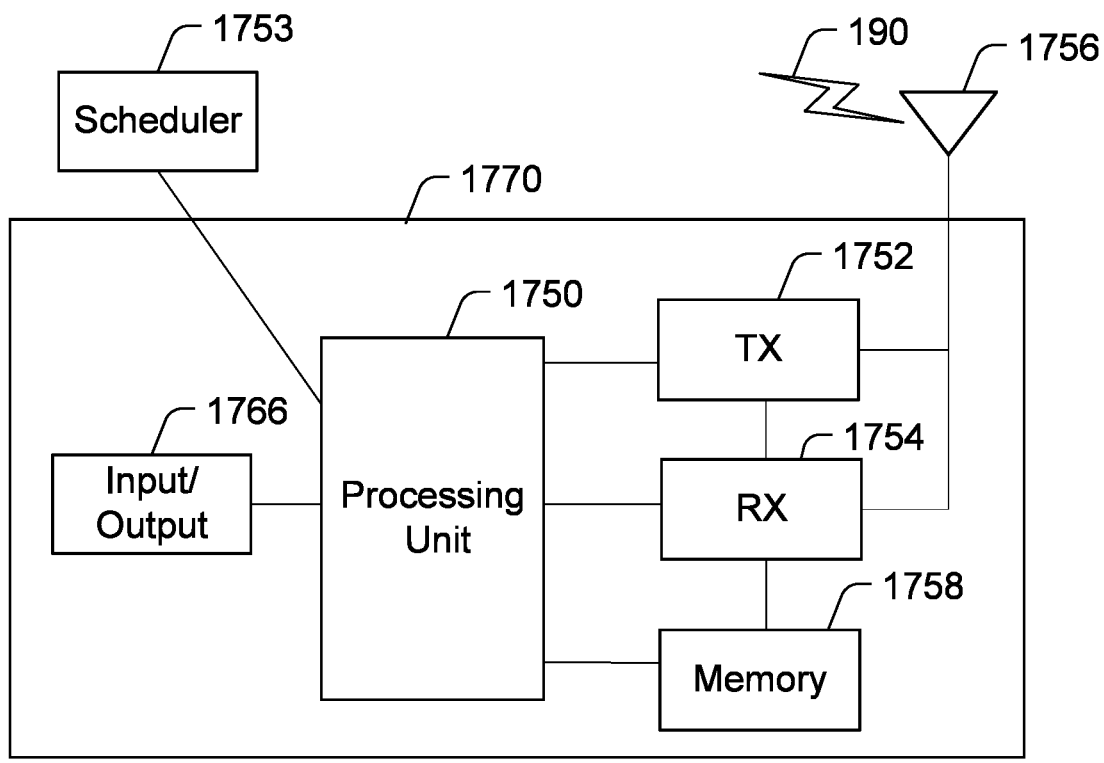

See, for example, FIGS. 22A and 22B which illustrate example devices that may implement the methods and teachings according to this disclosure.

FIG. 22A illustrates an example ED 1710, and FIG. 22B illustrates an example base station 1770. These components could be used in the system 100 (FIG. 1) or in any other suitable system.

As shown in FIG. 22A, the ED 1710 includes at least one processing unit 1700. The processing unit 1700 implements various processing operations of the ED 1710. For example, the processing unit 1700 could perform signal coding, data processing, power control, input processing, output processing, or any other functionality enabling the ED 1710 to operate in a communication system. The processing unit 1700 may also be configured to implement some or all of the functionality or embodiments described in more detail herein. Each processing unit 1700 includes any suitable processing or computing device configured to perform one or more operations. Each processing unit 1700 could, for example, include a microprocessor, microcontroller, digital signal processor, field programmable gate array, or application specific integrated circuit.

The ED 1710 also includes at least one transceiver 1702. The transceiver 1702 is configured to modulate data or other content for transmission by at least one antenna or NIC (Network Interface Controller) 1704. The transceiver 1702 is also configured to demodulate data or other content received by the at least one antenna 1704. Each transceiver 1702 includes any suitable structure for generating signals for wireless transmission and/or processing signals received wirelessly or by wire. Each antenna 1704 includes any suitable structure for transmitting and/or receiving wireless signals. One or multiple transceivers 1702 could be used in the ED 1710, and one or multiple antennas 1704 could be used in the ED 1710. Although shown as a single functional unit, a transceiver 1702 could be implemented using at least one transmitter and at least one separate receiver.

The ED 1710 further includes one or more input/output devices 1706 or interfaces. The input/output devices 1706 facilitate interaction with a user or other devices (network communications) in the network. Each input/output device 1706 includes any suitable structure for providing information to or receiving/providing information from a user, such as a speaker, microphone, keypad, keyboard, display, or touch screen, including network interface communications.

In addition, the ED 1710 includes at least one memory 1708. The memory 1708 stores instructions and data used, generated, or collected by the ED 1710. For example, the memory 1708 could store software instructions or modules configured to implement some or all of the functionality or embodiments described above and that are executed by the processing unit(s) 1700. Each memory 1708 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 22B, the base station 1770 includes at least one processing unit 1750, at least one transmitter 1752, at least one receiver 1754, one or more antennas 1756, at least one memory 1758, and one or more input/output devices or interfaces 1766. A transceiver, not shown, may be used instead of the transmitter 1752 and receiver 1754. A scheduler 1753 may be coupled to the processing unit 1750. The scheduler 1753 may be included within or operated separately from the base station 1770. The processing unit 1750 implements various processing operations of the base station 1770, such as signal coding, data processing, power control, input processing, output processing, or any other functionality. The processing unit 1750 can also be configured to implement some or all of the functionality or embodiments described in more detail herein. Each processing unit 1750 includes any suitable processing or computing device configured to perform one or more operations. Each processing unit 1750 could, for example, include a microprocessor, microcontroller, digital signal processor, field programmable gate array, or application specific integrated circuit.

Each transmitter 1752 includes any suitable structure for generating signals for wireless transmission to one or more EDs or other devices. Each receiver 1754 includes any suitable structure for processing signals received wirelessly or by wire from one or more EDs or other devices. Although shown as separate components, at least one transmitter 1752 and at least one receiver 1754 could be combined into a transceiver. Each antenna 1756 includes any suitable structure for transmitting, receiving, or both transmitting and receiving wireless signals. While a common antenna 1756 is shown here as being coupled to both the transmitter 1752 and the receiver 1754, one or more antennas 1756 could be coupled to the transmitter(s) 1752, and one or more separate antennas 1756 could be coupled to the receiver(s) 1754. Each memory 1758 includes any suitable volatile and/or non-volatile storage and retrieval device(s) such as those described above in connection to the ED 1710. The memory 1758 stores instructions and data used, generated, or collected by the base station 1770. For example, the memory 1758 could store software instructions or modules configured to implement some or all of the functionality or embodiments described herein and that are executed by the processing unit(s) 1750.

Each input/output device 1766 facilitates interaction with a user or other devices (network communications) in the network. Each input/output device 1766 includes any suitable structure for providing information to or receiving/providing information from a user, including network interface communications.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by these or other modules. The respective units or modules may be implemented using hardware, components that execute software, or a combination thereof. For instance, one or more of the units or modules may be or include one or more integrated circuits, such as field programmable gate arrays (FPGAs) or application-specific integrated circuits (ASICs). It will be appreciated that where the modules are implemented using software, they may be retrieved by a processor, in whole or part as needed, individually or together for processing, in single or multiple instances, and that the modules themselves may include instructions for further deployment and instantiation.

In general, hardware, firmware, components which execute software, or some combination thereof could be used in implementing features disclosed herein. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Any of various types of memory devices could be implemented. Either or both of the memory 1708 and the memory 1758, for example, could include one or more physical memory devices. Solid-state memory devices such as a Flash memory device could be implemented. Memory devices with movable or even removable storage media could also or instead be implemented.

FIG. 22A and FIG. 22B illustrate examples of a UE and a network device, respectively, in which embodiments could be implemented. More generally, an apparatus may be a UE or a network device, or included in a UE or network device, and the apparatus may include a processor and a non-transitory computer readable storage medium, such as the processing unit 1700, 1750 and memory 1708, 1758 in FIG. 22A or FIG. 22B. Examples of UEs and network devices are provided elsewhere herein. Other components, such as a communication interface to which the processor is coupled, may also be provided. Elements 1702, 1704, 1752, 1754, 1756 in FIGS. 22A and 22B are examples of communication interfaces that may be provided in some embodiments.

In an embodiment, the storage medium stores programming that includes instructions for execution by the processor, and the instructions when executed by the processor perform any of the methods as disclosed herein.

Another embodiment relates to a computer program product that includes a non-transitory computer readable storage medium storing programming. The programming includes instructions, and the instructions when executed by the processor perform any of the methods as disclosed herein.

In some embodiments, the apparatus is a UE that includes a communication interface, a processor coupled to the communication interface, and such a non-transitory computer readable storage medium coupled to the processor. A processor and a medium are shown by way of example as the processing unit 1700 and memory 1708 in FIG. 22A, and a communication interface may include such elements as the transceiver 1702 and/or one or more antennas 1704. A network device such as a base station or other network equipment could include a communication interface, a processor coupled to the communication interface, and a non-transitory computer readable storage medium coupled to the processor. A processor and a medium are shown by way of example as the processing unit 1750 and memory 1758 in FIG. 22B, and a communication interface may include such elements as the transmitter 1752, the receiver 1754, and/or one or more antennas 1756.

Other features that could be implemented in UE and network device embodiments could be or become apparent, for example, from the method embodiments disclosed herein.

Figure 23:
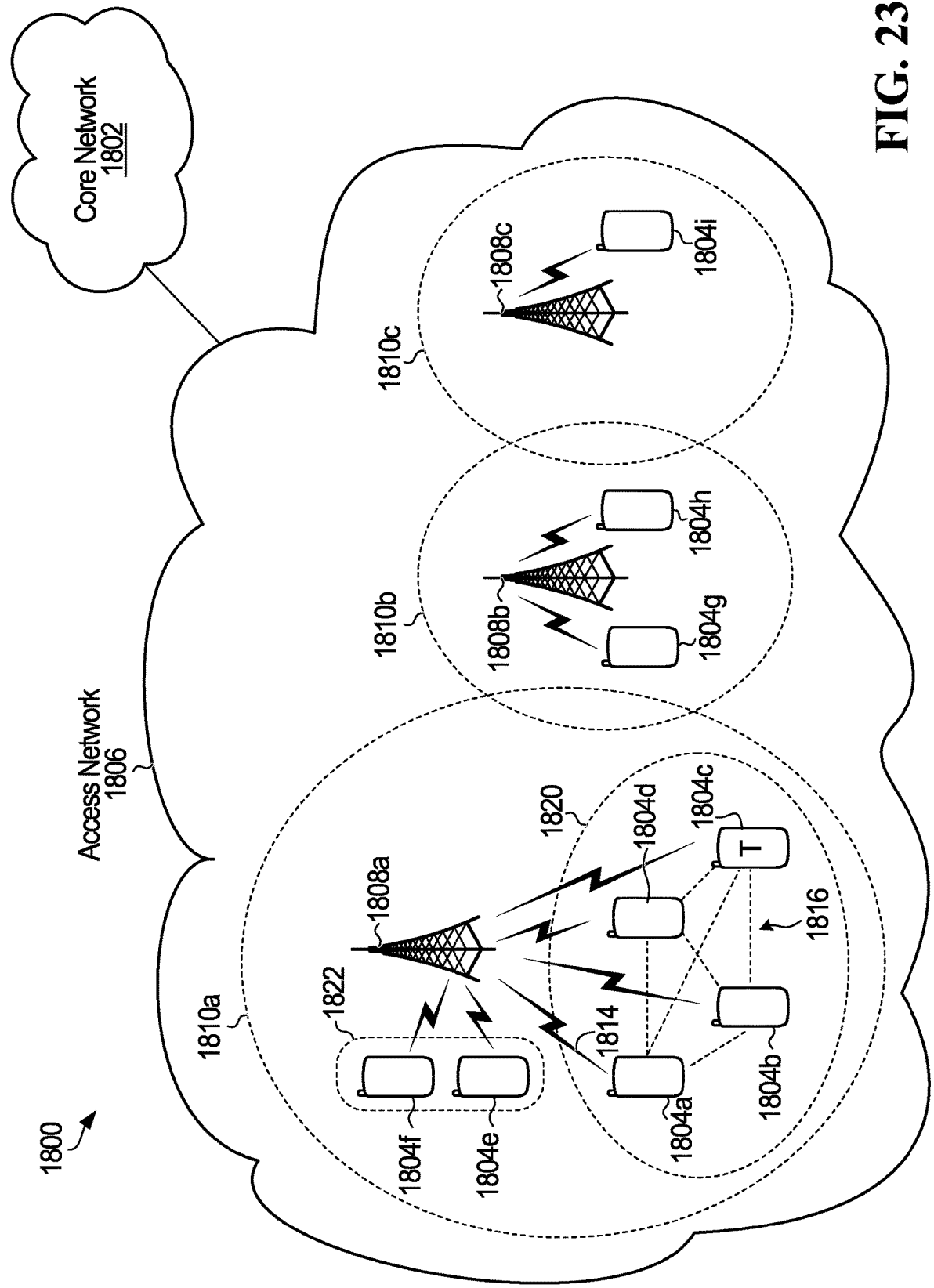
FIG. 23 is a block diagram illustrating an example of a telecommunications network according to one embodiment.

FIG. 23 is a block diagram illustrating an example of a telecommunications network 1800 according to one embodiment. The telecommunications network 1800 includes a core network 1802 and a radio access network 1806. The radio access network 1806 serves a plurality of UEs 1804a, 1804b, 1804c, 1804d, 1804e, 1804f, 1804g, 1804h, and 1804i. The access network 1806 is an Evolved Universal Terrestrial Access (E-UTRA) network in some embodiments. Another example of a radio access network 1806 is a cloud access network (C-RAN). The radio access network 1806 includes a plurality of BSs 1808a, 1808b, and 1808c. The BSs 1808a-c each provide a respective wireless coverage area 1810a, 1810b, and 1810c, also referred to as a cell. Each of the BSs 1808a-c could be implemented using a radio transceiver, one or more antennas, and associated processing circuitry, such as antenna radio frequency (RF) circuitry, one or more analog-to-digital converters, one or more digital-to-analog converters, etc.

Although not illustrated, the BSs 1808a-c are each connected to the core network 1802, either directly or through one or more central processing hubs, such as servers. The BSs 1808a-c could serve as a gateway between the wireline and wireless portion of the access network 1806.

Each one of BSs 1808a-c may instead be referred to as a base transceiver station, a radio BS, a network node, a transmit node, a transmit point, a Node B, an eNode B, a remote radio head (RRH), or otherwise, depending upon the implementation.

In operation, the plurality of UEs 1804a-i access the telecommunications network 1800 using the access network 1806 by wirelessly communicating with one or more of the BSs 1808a-c.

UEs 1804a-d are in close proximity to each other. Although the UEs 1804a-d can each wirelessly communicate with the BS 1808a, they can also directly communicate with each other, as represented at 1816. The communications represented at 1816 are direct communications between UEs, such as sidelink communications as disclosed herein, that do not go through an access network component, such as a BS. As shown in FIG. 23, UE to UE communications 1816 are directly between the UEs 1804a-d and are not routed through the BS 1808a, or any other part of the access network 1806. Communications 1816 may also be referred to as lateral communications. In embodiments disclosed herein, UE to UE communications use a sidelink channel and a sidelink air interface. On the other hand, a communication between an access network component, such as BS 1808*a*, and a UE, as in communication 1814, is called an access communication. An access communication occurs over an access channel, which can be an uplink or downlink channel, and an access communication uses a radio access communication interface, such as a cellular radio access air interface. Access and sidelink air interfaces may use different transmission formats, such as different waveforms, different multiple access schemes, or different radio access technologies. Some examples of radio access technologies that could be used by an access air interface or a sidelink air interface are: Long Term Evolution (LTE), LTE License Assisted Access (LTE-LAA), and WiFi.

By using the sidelink communications 1816, the UEs 1804*a-d* may be able to assist with wireless communications between the UEs 1804*a-d* and the BS 1808*a*. As one example, if UE 1804*c* fails to correctly decode a packet received from the BS 1808*a* but UE 1804*d* is able to receive and correctly decode the packet from the BS 1808*a*, then UE 1804*d* could directly transmit the decoded packet to UE 1804*c* using sidelink communications 1816. As another example, if UE 1804*c* moves out of wireless coverage area 1818*c*, such that UE 1804*c* can no longer wirelessly communicate with the BS 1808*a*, then UE 1804*b* could forward messages between the UE 1804*c* and the BS 1808*a*. As another example, UE 1804*a* and UE 1804*c* could both receive a signal transmitted from the BS 1808*a* that carries a packet meant for UE 1804*c*. UE 1804*a* may then transmit to UE 1804*c*, via sidelink communications 1816, the signal as received by UE 1804*a*. UE 1804*c* may then use the information received from UE 1804*a* to help decode the packet from the BS 1808*a*. In these examples, capacity or coverage may be improved by forming an enhanced UE to assist one or more of the UEs 1804*a*, 1804*b*, and 1804*d*.

The UEs 1804*a-d* form a UE group 1820 in some embodiments. It should be noted, however, that features as disclosed herein are not dependent upon UE groups being explicitly formed in advance.

In UE group 1820 and a scenario in which the UE 1804*c* is to be assisted, the other UEs 1804*a*, 1804*b*, and 1804*d* form a cooperation candidate set for assisting the UE 1804*c*. If UEs 1804*a* and 1804*b* assist the UE 1804*c*, then the UEs 1804*a* and 1804*b* form the cooperation active set. As UEs 1804*a-d* move around, some may leave the UE group 1820. UE movement may also or instead result in other UEs joining the UE group 1820. Therefore, the cooperation candidate set may change over time. For example, the cooperation candidate set may change semi-statically. The UE group 1820 may also be terminated by the network 1806, for example, if the network determines that there is no longer a need or opportunity for the UE group 1820 to provide assistance in wireless communication between the BS 1808*a* and members of the UE group 1820.

There may be more than one UE group. For example, UEs 1804*e* and 1804*f* in FIG. 23 form another UE group 1822.

Figure 24:
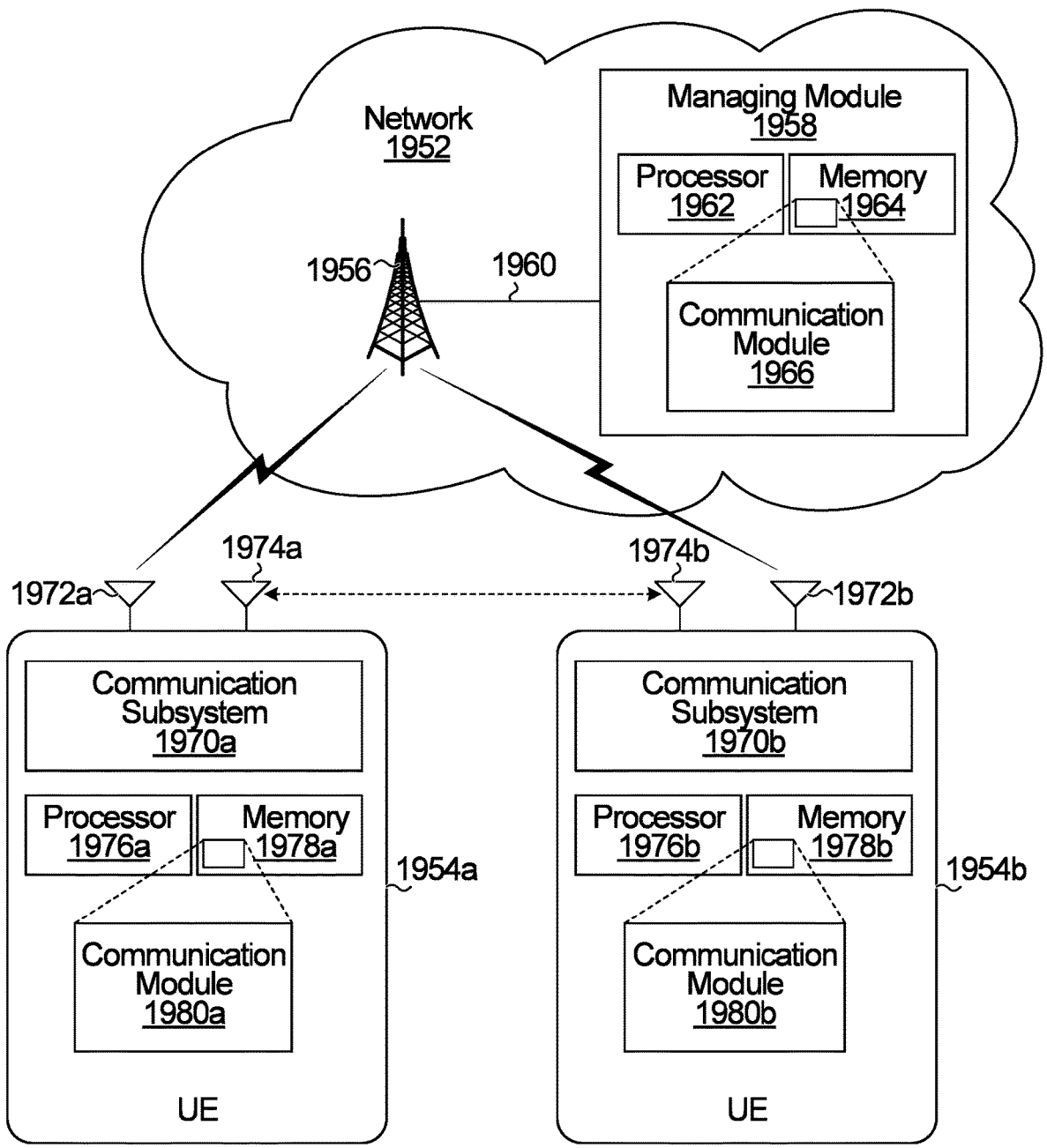
FIG. 24 is a block diagram illustrating an example of a network serving two UEs.

FIG. 24 is a block diagram illustrating an example of a network 1952 serving two UEs 1954*a* and 1954*b*, according to one embodiment. The network 1952 may be the access network 1806 from FIG. 23, and the two UEs 1954*a* and 1954*b* may be two of the four UEs 1804*a-d* in FIG. 23, or the UEs 1954*a* and 1954*b* may be UEs 1804*e* and 1804*f* in FIG. 23. However, more generally this need not be the case, which is why different reference numerals are used in FIG. 24.

The network 1952 includes a BS 1956 and a managing module 1958. The managing module 1958 instructs the BS 1956 to perform actions. The managing module 1958 is illustrated as physically separate from the BS 1956 and coupled to the BS 1956 via a communication link 1960. For example, the managing module 1958 may be part of a server in the network 1952. Alternatively, the managing module 1958 may be part of the BS 1956.

The managing module 1958 includes a processor 1962, a memory 1964, and a communication module 1966. The communication module 1966 is implemented by the processor 1962 when the processor 1962 accesses and executes a series of instructions stored in the memory 1964, the instructions defining the actions of the communication module 1966. When the instructions are executed, the communication module 1966 causes the BS 1956 to perform the actions described herein so that the network 1952 can establish, coordinate, instruct, or control UE cooperation and enhanced UE formation and operation. Alternatively, the communication module 1966 may be implemented using dedicated circuitry, such as an application specific integrated circuit (ASIC) or a programmed field programmable gate array (FPGA).

The UE 1954*a* includes a communication subsystem 1970*a*, two antennas 1972*a* and 1974*a*, a processor 1976*a*, and a memory 1978*a*. The UE 1954*a* also includes a communication module 1980*a*. The communication module 1980*a* is implemented by the processor 1976*a* when the processor 1976*a* accesses and executes a series of instructions stored in the memory 1978*a*, the instructions defining the actions of the communication module 1980*a*. When the instructions are executed, the communication module 1980*a* causes the UE 1954*a* to perform actions described herein in relation to UE cooperation. Alternatively, the module 1980*a* may be implemented by dedicated circuitry, such as an ASIC or an FPGA.

The communication subsystem 1970*a* includes processing circuitry, transmit circuitry, and receive circuitry for sending messages from and receiving messages at the UE 1954*a*. Although one communication subsystem 1970*a* is illustrated, the communication subsystem 1970*a* may be multiple communication subsystems. Antenna 1972*a* transmits wireless communication signals to, and receives wireless communications signals from, the BS 1956. Antenna 1974*a* transmits sidelink communication signals to, and receives sidelink communication signals from, other UEs, including UE 1954*b*. In some implementations there may not be two separate antennas 1972*a* and 1974*a*. A single antenna may be used. Alternatively, there may be several antennas, but not separated into antennas dedicated only to sidelink communication and antennas dedicated only to communicating with the BS 1956.

SL communications could be over Wi-Fi, in which case the antenna 1974*a* may be a Wi-Fi antenna. Alternatively, the sidelink communications could be over Bluetooth™, in which case the antenna 1974*a* may be a Bluetooth™ antenna. Sidelink communications could also or instead be over licensed or unlicensed spectrum.

The UE 1954*b* includes the same components described above with respect to the UE 1954*a*. That is, UE 1954*b* includes communication subsystem 1970*b*, antennas 1972*b* and 1974*b*, processor 1976*b*, memory 1978*b*, and communication module 1980*b*.

FIGS. 23 and 24 illustrate systems in which embodiments could be implemented. In some embodiments, a UE includes a processor, such as 1976*a*, 1976*b* in FIG. 24, and a non-transitory computer readable storage medium, such as 1978*a*, 1978*b* in FIG. 24, storing programming comprising instructions for execution by the processor. A non-transitory computer readable storage medium could also or instead be provided separately, as a computer program product. Examples are provided elsewhere herein.

The present disclosure describes various embodiments. Some embodiments relate to protocol stack configuration or formation for VUE with different possible data split/aggregation/path switch points, such as at one of PDCP, RLC, MAC, or PHY layers.

Individual UE capability and capability for operating as a component UE of a VUE could be reported as different capabilities, and VUE capability could be reported dynamically with different configurations, for MIMO, CA, DC, etc.

VUE and individual UEs sharing protocol stacks and RF chains could be scheduled in TDM manner in some embodiments.

Some embodiments may provide flexible procedures for UEs and a network to configure a VUE.

Embodiments disclosed herein encompass, among others, the examples below.

An example 1 relates to a method comprising: receiving, by an apparatus, from multiple UEs, a capability of each of the multiple UEs and a capability for UE aggregation including an indication of whether a respective UE is capable of UE aggregation; and transmitting, by the apparatus, a VUE configuration to a plurality of UEs of the multiple UEs that are capable of UE aggregation, the VUE configuration including protocol stacks for the plurality of UEs and an indication of an anchor point, wherein the anchor point is for a protocol stack of a first UE of the plurality of UEs.

An example 2 relates to the method of example 1, further comprising communicating, by the network device, data with the VUE formed in accordance with the UE aggregation configuration.

An example 3 relates to the method of example 1, wherein the anchor point comprises an anchor point in a PDCP layer, an RLC layer, a MAC layer, or a PHY layer of the protocol stack for the first UE.

An example 4 relates to the method of example 1, wherein the anchor point comprises an anchor point in the PDCP layer of the protocol stack of the first UE, to enable formation of a VUE with a dual connectivity capability.

An example 5 relates to the method of example 1, wherein the anchor point comprises an anchor point in the MAC layer in the protocol stack of the first UE, to enable formation of a VUE with carrier aggregation capability.

An example 6 relates to the method of example 1, wherein the anchor point comprises an anchor point in the MAC layer or the PHY layer in the protocol stack of the first UE, to enable formation of a VUE with enhanced MIMO capability.

An example 7 relates to the method of any one of examples 1 to 6, wherein the data is distributed to the respective protocol stacks of the plurality of UEs at the anchor point for transmission by the plurality of UEs, to enable increased transmit power when transmitting the data.

An example 8 relates to the method of any one of examples 1 to 7, wherein communicating a configuration comprises transmitting the configuration to one or more of the plurality of UEs.

An example 9 relates to the method of any one of examples 1 to 8, wherein the configuration further indicates a fallback mode that involves a subset of the plurality of UEs.

An example 10 relates to the method of example 9, further comprising: transmitting, by the network device, signaling to provide an explicit or implicit indication of switching between the UE aggregation and the fallback mode.

An example 11 relates to the method of any one of examples 1 to 10, further comprising: transmitting, by the network device, signaling to disable the configuration for UE aggregation.

An example 12 relates to the method of any one of examples 1 to 11, wherein the protocol stacks comprise a protocol stack that is shared by one of the plurality of UEs for the UE aggregation.

An example 13 relates to a method comprising: receiving, by a UE from a network device, a VUE configuration for UE aggregation, the VUE configuration indicating protocols stack for a plurality of UEs including the UE, that participate in UE aggregation, and an anchor point, wherein the anchor point is for a protocol stack of a first UE of the plurality of UEs An example 14 relates to the method of example 13, further comprising forming a VUE in accordance with the VUE configuration and communicating data with the network device using the plurality of UEs of the VUE.

An example 15 relates to the method of example 14, wherein communicating the data comprises communicating the data according to scheduling for the UE aggregation.

An example 16 relates to the method of example 15, wherein the scheduling uses TDM for the UE aggregation and individual transmissions of the multiple UEs.

An example 17 relates to the method of any one of examples 13 to 16, wherein the anchor point comprises an anchor point in a PDCP layer, an RLC layer, a MAC layer, or a PHY layer in the protocol stack of the first UE.

An example 18 relates to the method of example 17, wherein the anchor point comprises an anchor point in the PDCP layer in the protocol stack of the first UE, to provide a dual connectivity capability.

An example 19 relates to the method of example 17, wherein the anchor point comprises an anchor point in the MAC layer in the protocol stack of the first UE, to provide a carrier aggregation capability.

An example 20 relates to the method of example 17, wherein the anchor point comprises an anchor point in the MAC layer or the PHY layer in the protocol stack of the first UE, to provide MIMO capability.

An example 21 relates to the method of any one of examples 13 to 20, wherein the data is distributed between the respective protocol stacks of the multiple UEs at the anchor point for transmission by the multiple UEs, to enable increased transmit power in communicating the data.

An example 22 relates to the method of any one of examples 13 to 21, wherein the configuration further indicates a fallback mode that involves a subset of the multiple UEs.

An example 23 relates to the method of example 22, further comprising: receiving, by the UE, signaling to provide an explicit or implicit indication of switching between the UE aggregation and the fallback mode.

An example 24 relates to the method of any one of examples 13 to 23, further comprising: communicating, in the wireless communication network, signaling to disable the configuration for UE aggregation.

An example 25 relates to the method of any one of examples 13 to 24, wherein the respective protocol stacks comprise a protocol stack that is shared by one of the multiple UEs for the UE aggregation.

An example 26 relates to an apparatus, such as a network device, comprising: at least one processor; a non-transitory computer readable storage medium, coupled to the at least one processor, storing programming for execution by the at least one processor, the programming including instructions to perform the method of any one of examples 1 to 12. The network device may further comprise a communication interface coupled to the at least one processor.

An example 27 relates to an apparatus, such as a UE, comprising: at least one processor; a non-transitory computer readable storage medium, coupled to the processor, storing programming for execution by the processor, the programming including instructions to perform the method of any one of examples 13 to 25. The UE may further comprise a communication interface coupled to the at least one processor.

An example 28 relates to a computer program product comprising a non-transitory computer readable storage medium storing programming, the programming including instructions to perform the method of any one of examples 1 to 12.

An example 29 relates to a computer program product comprising a non-transitory computer readable storage medium storing programming, the programming including instructions to perform the method of any one of examples 13 to 25.

What has been described is merely illustrative of the application of principles of embodiments of the present disclosure. Other arrangements and methods can be implemented by those skilled in the art.

For example, many embodiments disclosed herein relate to examples of UE aggregation for the purpose of uplink communications and/or downlink communications with a network. In other embodiments, a VUE may transmit data to and/or receive data from another UE or device, over an SL for example, instead of a network device. For example, a VUE may transmit data to and/or receive data from another UE that is not part of the VUE. In other words, a number of UEs could form a VUE and help one UE (SUE or TUE) to transmit to and/or receive from another UE that is not part of this VUE.

In addition, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although aspects of the present invention have been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Features that are disclosed herein in the context of particular embodiments are not necessarily restricted only to those embodiments. For example, many disclosed embodiments relate to configuring or forming a VUE, but as noted previously UE aggregation need not result in a VUE. Anchor point, protocol stack configuration, enhanced capability, and many other features disclosed herein in the context of VUEs also apply to UE aggregation regardless of whether the end result is a VUE with a separate identifier.

Furthermore, although described primarily in the context of methods and apparatus, other implementations are also contemplated, as instructions stored on a non-transitory computer-readable medium, for example. Such media could store programming or instructions to perform any of various methods consistent with the present disclosure.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

What is claimed is:

1. A method comprising:
transmitting to a plurality of user equipments (UEs), a configuration indicating that the plurality of UEs are to participate in data communication; and
communicating the data between a network device and a first UE, in accordance with the configuration, wherein the communicating the data comprises:
transmitting the data, after splitting or duplicating the data at the network device, to the first UE through a plurality of different paths, each path comprising at least one respective UE of the plurality of UEs including the first UE; or
receiving, from the first UE, through a plurality of different paths, the data for combining at the network device, each path comprising at least one respective UE of the plurality of UEs including the first UE.

2. The method of claim 1, wherein the splitting or duplicating and the combining are operated in one of a packet data convergence protocol (PDCP) layer, a radio link control (RLC) layer, a medium access control (MAC) layer, or a physical (PHY) layer.

3. The method of claim 1, wherein the method further comprises:
receiving capability information indicating the capability to participate in the data communication between the network device and the first UE from the plurality of UEs.

4. The method of claim 1, wherein the configuration further indicates a fallback mode that involves a subset of the plurality of UEs.

5. The method of claim 4, further comprising:
transmitting signaling to provide an explicit or implicit indication of switching between the data communication via the plurality of UEs and the fallback mode.

6. The method of claim 1, wherein the configuration indicates protocol stacks to operate over the plurality of UEs with the splitting or duplicating and the combining operating on the first UE.

7. A method comprising:
receiving, by a first user equipment (UE) from an apparatus, a configuration indicating that the first UE is to participate as one of a plurality of UEs in data communication; and
communicating the data between a network device and the first UE, in accordance with the configuration, wherein the communicating the data comprises:
transmitting the data, after splitting or duplicating the data at the first UE, to the network device through a plurality of different paths, each path comprising at least one respective UE of the plurality of UEs including the first UE; or
receiving, from the network device, through a plurality of different paths, the data for combining at the first UE, each path comprising at least one respective UE of the plurality of UEs including the first UE.

8. The method of claim 7, wherein the splitting or duplicating and the combining are operated in one of a packet data convergence protocol (PDCP) layer, a radio link control (RLC) layer, a medium access control (MAC) layer, or a physical (PHY) layer.

9. The method of claim 7, wherein the method further comprises:
transmitting to the apparatus capability information indicating the capability to participate in the data communication between the network device and the first UE.

10. The method of claim 7, wherein the communicating the data comprises communicating the data according to scheduling of the transmitting or receiving.

11. The method of claim 10, wherein the scheduling uses time division multiplexing (TDM) for the transmitting.

12. The method of claim 7, wherein the configuration further indicates a fallback mode that involves a subset of the plurality of UEs.

13. The method of claim 12, further comprising:
receiving, by the UE, signaling to provide an explicit or implicit indication of switching between the data communication via the plurality of UEs and the fallback mode.

14. The method of claim 7, wherein the configuration indicates protocol stacks to operate over the plurality of UEs with the splitting or duplicating and the combining operating on the first UE.

15. An apparatus comprising:
at least one processor, coupled to a non-transitory computer readable storage medium storing programming for execution by the processor, the programming including instructions to perform the method comprising:
transmitting to a plurality of user equipments (UEs), a configuration indicating that the plurality of UEs are to participate in data communication; and
communicating the data between a network device and a first UE, in accordance with the configuration, wherein the communicating the data comprises:
transmitting the data, after splitting or duplicating the data at the apparatus, to the first UE through a plurality of different paths, each path comprising at least one respective UE of the plurality of UEs including the first UE; or
receiving from the first UE, through a plurality of different paths, the data for combining at the apparatus, each path comprising at least one respective UE of the plurality of UEs including the first UE.

16. A second apparatus comprising:
at least one processor, coupled to a non-transitory computer readable storage medium storing programming for execution by the processor, the programming including instructions to perform the method comprising:
receiving, from an apparatus, a configuration indicating that the second apparatus is to participate as one of a plurality of apparatuses in data communication; and
communicating the data between a network device and the second apparatus, in accordance with the configuration, wherein the communicating the data comprises:
transmitting the data, after splitting or duplicating the data at the second apparatus, to the network device through a plurality of different paths, each path comprising at least one respective apparatus of the plurality of apparatuses including the second apparatus; or
receiving, from the network device, through a plurality of different paths, the data for combining at the second apparatus, each path comprising at least one respective apparatus of the plurality of apparatuses including the second apparatus.

17. The method of claim 7, wherein the apparatus is the network device or another UE of the plurality of UEs.

18. The method of claim 8, wherein when the splitting or duplicating is operated in one of the MAC layer, or the PHY layer, a first time offset is indicated, wherein the first time offset is an offset between a time of receiving a scheduling signaling for the data transmission and a time of transmitting the data.

19. The method of claim 8, wherein when the combining is operated in one of the MAC layer, or the PHY layer, a second time offset is indicated, wherein the second time offset is an offset between a time of receiving a scheduling signalling for the data transmission and a time of transmitting an acknowledgment indication of the receiving data.

* * * * *